US009019209B2

(12) United States Patent
Geaghan

(10) Patent No.: US 9,019,209 B2
(45) Date of Patent: Apr. 28, 2015

(54) TOUCH LOCATION DETERMINATION INVOLVING MULTIPLE TOUCH LOCATION PROCESSES

(75) Inventor: Bernard O. Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 2064 days.

(21) Appl. No.: 11/148,109

(22) Filed: Jun. 8, 2005

(65) Prior Publication Data

US 2006/0279548 A1    Dec. 14, 2006

(51) Int. Cl.
| G06F 3/041 | (2006.01) |
| G06F 3/043 | (2006.01) |
| G06F 3/044 | (2006.01) |
| G06F 3/0354 | (2013.01) |
| G06F 3/042 | (2006.01) |
| G06F 3/046 | (2006.01) |

(52) U.S. Cl.
CPC ............ *G06F 3/0416* (2013.01); *G06F 3/0436* (2013.01); *G06F 3/044* (2013.01); *G06F 2203/04101* (2013.01); *G06F 2203/04106* (2013.01); *G06F 3/03545* (2013.01); *G06F 3/0421* (2013.01); *G06F 3/043* (2013.01); *G06F 3/046* (2013.01)

(58) Field of Classification Search
USPC ......... 345/156, 157, 158, 159, 162, 173, 174, 345/175, 176, 177, 178, 179, 180, 181, 182, 345/183, 184; 178/18.01, 18.02, 18.03, 178/18.04, 18.05, 18.06, 18.07, 18.08, 178/18.09, 18.11, 19.01, 19.02, 19.03, 178/19.04, 19.05, 19.06, 19.07, 20.01, 178/20.02, 20.03, 20.04; 341/20; 200/512
See application file for complete search history.

(56) References Cited

U.S. PATENT DOCUMENTS

| 4,644,100 | A | * | 2/1987 | Brenner et al. | ............ | 178/18.04 |
| 4,791,416 | A | * | 12/1988 | Adler | ............................ | 345/177 |
| 4,980,518 | A | * | 12/1990 | Kobayashi et al. | ........ | 178/18.04 |
| 5,097,415 | A | * | 3/1992 | Yoshimura et al. | ........ | 178/18.04 |
| 5,329,070 | A | * | 7/1994 | Knowles | .................... | 178/18.04 |
| 5,380,959 | A | * | 1/1995 | Knowles | .................... | 178/18.04 |
| 5,543,589 | A | * | 8/1996 | Buchana et al. | ........... | 178/18.03 |

(Continued)

FOREIGN PATENT DOCUMENTS

| CN | 1228182 | 9/1999 |
| EP | 1 335 318 | 8/2003 |

(Continued)

OTHER PUBLICATIONS

U.S. Appl. No. 11/025,389, filed Dec. 29, 2004, Robert J. Pechman et al.

(Continued)

*Primary Examiner* — Michael Faragalla
(74) *Attorney, Agent, or Firm* — Robert S. Moshrefzadeh

(57) ABSTRACT

Touch location determination approaches involving a plurality of touch location techniques are described. Each touch location technique is capable of independently determining a location of a touch within a touch area of the touch sensitive device. The touch location determination made by at least one touch location technique is enhanced using touch location information associated with the touch acquired from one or more other touch location techniques. One touch location technique may use a different type of sensor, signal, and/or algorithm from the one or more other touch location techniques.

8 Claims, 25 Drawing Sheets

(56) References Cited

U.S. PATENT DOCUMENTS

| | | | |
|---|---|---|---|
| 5,635,643 A | 6/1997 | Maji | |
| 5,691,959 A | 11/1997 | Kriewall et al. | |
| 5,854,450 A * | 12/1998 | Kent | 178/18.04 |
| 5,986,224 A * | 11/1999 | Kent | 178/18.04 |
| 6,138,512 A * | 10/2000 | Roberts et al. | 73/570 |
| 6,492,979 B1 | 12/2002 | Kent et al. | |
| 6,504,530 B1 | 1/2003 | Wilson et al. | |
| 6,525,717 B1 * | 2/2003 | Tang | 345/177 |
| 6,630,929 B1 * | 10/2003 | Adler et al. | 345/177 |
| 6,723,929 B2 * | 4/2004 | Kent | 178/18.04 |
| 6,856,259 B1 * | 2/2005 | Sharp | 341/5 |
| 6,871,149 B2 | 3/2005 | Sullivan et al. | |
| 6,933,930 B2 * | 8/2005 | Devige et al. | 345/173 |
| 7,061,475 B2 * | 6/2006 | Kent | 345/177 |
| 7,079,118 B2 * | 7/2006 | Benard et al. | 345/173 |
| 7,116,315 B2 * | 10/2006 | Sharp et al. | 345/177 |
| 7,158,126 B2 * | 1/2007 | Trajkovic et al. | 345/177 |
| 7,230,609 B2 * | 6/2007 | Chao et al. | 345/173 |
| 7,248,249 B2 * | 7/2007 | Kong et al. | 345/173 |
| 7,295,191 B2 * | 11/2007 | Kraus et al. | 345/173 |
| 7,345,677 B2 * | 3/2008 | Ing et al. | 345/173 |
| 2001/0006006 A1 * | 7/2001 | Hill | 73/606 |
| 2003/0063073 A1 * | 4/2003 | Geaghan et al. | 345/173 |
| 2003/0066692 A1 * | 4/2003 | Devige et al. | 178/18.04 |
| 2003/0132922 A1 * | 7/2003 | Philipp | 345/173 |
| 2003/0164820 A1 * | 9/2003 | Kent | 345/177 |
| 2003/0217873 A1 | 11/2003 | Paradiso et al. | |
| 2004/0233174 A1 | 11/2004 | Robrecht et al. | |
| 2005/0012724 A1 * | 1/2005 | Kent | 345/177 |
| 2005/0078093 A1 | 4/2005 | Peterson, Jr. et al. | |
| 2005/0134574 A1 | 6/2005 | Hill | |
| 2005/0146512 A1 | 7/2005 | Hill et al. | |
| 2005/0146513 A1 | 7/2005 | Hill et al. | |

FOREIGN PATENT DOCUMENTS

| | | |
|---|---|---|
| WO | WO 98/07127 | 2/1998 |
| WO | WO 01/04864 | 1/2001 |
| WO | WO 01/48684 A2 | 7/2001 |
| WO | WO 03/005292 | 1/2003 |
| WO | WO 03/046882 | 6/2003 |

OTHER PUBLICATIONS

U.S. Appl. No. 11/032,572, filed Jan. 10, 2005, Jerry B. Roberts.
U.S. Appl. No. 11/093,895, filed Mar. 30, 2005, Bernard O. Geaghan et al.
U.S. Appl. No. 11/116,463, filed Apr. 28, 2005, Bernard O. Geaghan.
U.S. Appl. No. 11/116,576, filed Apr. 28, 2005, Bernard O. Geaghan.

* cited by examiner

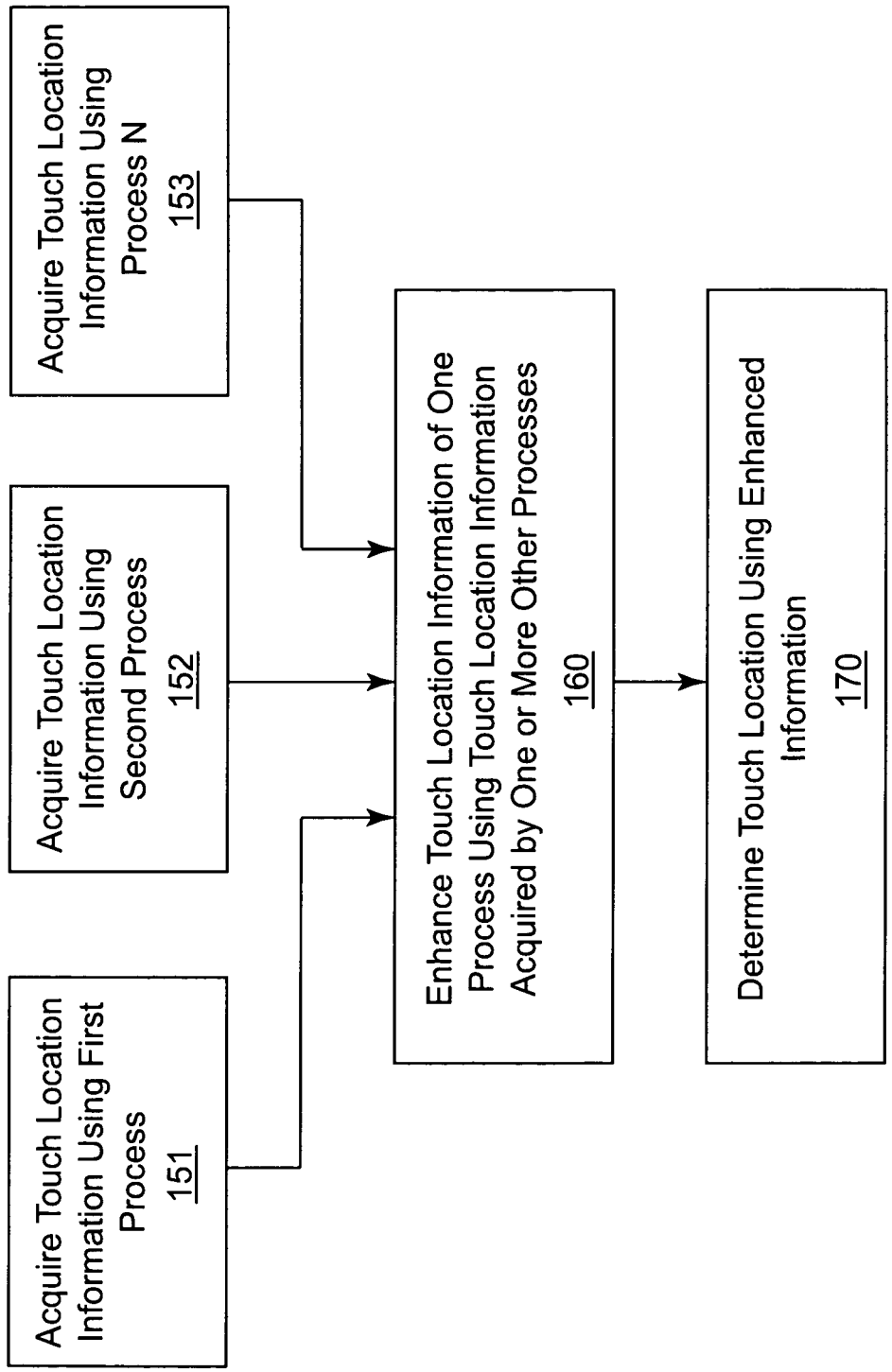

TOUCH LOCATION DETERMINATION INVOLVING MULTIPLE TOUCH LOCATION PROCESSES

FIELD OF THE INVENTION

The present invention relates to touch sensitive devices and, more particularly, to methods and systems using multiple touch detection processes to determine a location of a touch on a touch sensitive panel.

BACKGROUND

Various methods have been used to determine the location of a touch on a touch sensitive panel. Touch location may be determined, for example, using a number of force sensors coupled to the touch panel. The force sensors generate an electrical signal that changes in response to a touch. The relative magnitudes of the signals generated by the force sensors may be used to determine the touch location.

Capacitive touch location techniques involve sensing a current change due to capacitive coupling created by a touch on the touch panel. A small amount of voltage is applied to a touch panel at several locations, for example, at each of the touch panel corners. A touch on the touch panel couples in a capacitance that alters the current flowing from each corner. The capacitive touch system measures the currents and determines the touch location based on the relative magnitudes of the currents.

Resistive touch panels are typically multilayer devices having a flexible top layer and a rigid bottom layer separated by spacers. A conductive material or conductive array is disposed on the opposing surfaces of the top and bottom layers. A touch flexes the top layer causing contact between the opposing conductive surfaces. The system determines the touch location based on the change in the touch panel resistance caused by the contact.

Touch location determination may rely on optical or acoustic signals. Infrared techniques used in touch panels typically utilize a specialized bezel that emits beams of infrared light along the horizontal and vertical axes. Sensors detect a touch that breaks the infrared beams.

Surface Acoustic Wave (SAW) touch location processes use high frequency waves propagating on the surface of a glass screen. Attenuation of the waves resulting from contact of a finger with the glass screen surface is used to detect touch location. SAW typically employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

Bending wave touch technology senses vibrations created by a touch in the bulk material of the touch sensitive substrate. These vibrations are denoted bending waves and may be detected using bending mode sensors typically placed on the edges of the substrate. Signals generated by the sensors are analyzed to determine the touch location. In some implementations, the sensor signals may be processed to account for frequency dispersion caused by the substrate material.

For any of the technologies outlined above, increasing the accuracy and/or speed of touch location determination and decreasing the processing and/or cost of the implementation is desirable. The present invention fulfils these and other needs, and offers other advantages over the prior art.

SUMMARY OF THE INVENTION

The present invention is directed to methods and systems for using multiple touch detection processes to determine a location of a touch on a touch sensitive panel.

One embodiment of the invention is directed to a method of touch location determination involving a plurality of touch location techniques. Each touch location technique is capable of independently determining a location of a touch within a touch area of the touch sensitive device. The touch location determination made by at least one touch location technique is enhanced using touch location information associated with the touch acquired from one or more other touch location techniques.

According to one implementation of the invention one touch location technique determines the touch location with a first degree of precision and the other touch location technique(s) determine the touch location with a second degree of precision. In another implementation, one touch location technique determines the touch location with first degree of accuracy and the other touch location technique(s) determine the touch location with a second degree of accuracy. Enhancing the touch location determination may involve adjusting data acquired using one touch location technique using the touch information acquired using the other touch location techniques.

In accordance with various aspects, one touch location technique may use a different type of sensor, signal, and/or algorithm from the one or more other touch location techniques. Enhancing the touch location determination may involve correcting errors associated with one touch location technique using the touch location information acquired from one or more other touch location techniques.

Another embodiment of the invention involves a touch sensitive device. The touch sensitive device includes at least one touch detector configured to determine a location of a touch on a touch panel and one or more other touch detectors configured to acquire touch location information. The touch sensitive device also includes processing circuitry coupled to the plurality of touch detectors. The processing circuitry is configured to enhance a touch location determination made by at the least one touch detector using the touch location information associated with the touch acquired using the one or more other touch detectors.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 1A is a diagram illustrating a method of touch location determination in accordance with embodiments of the invention;

Figure 1B:
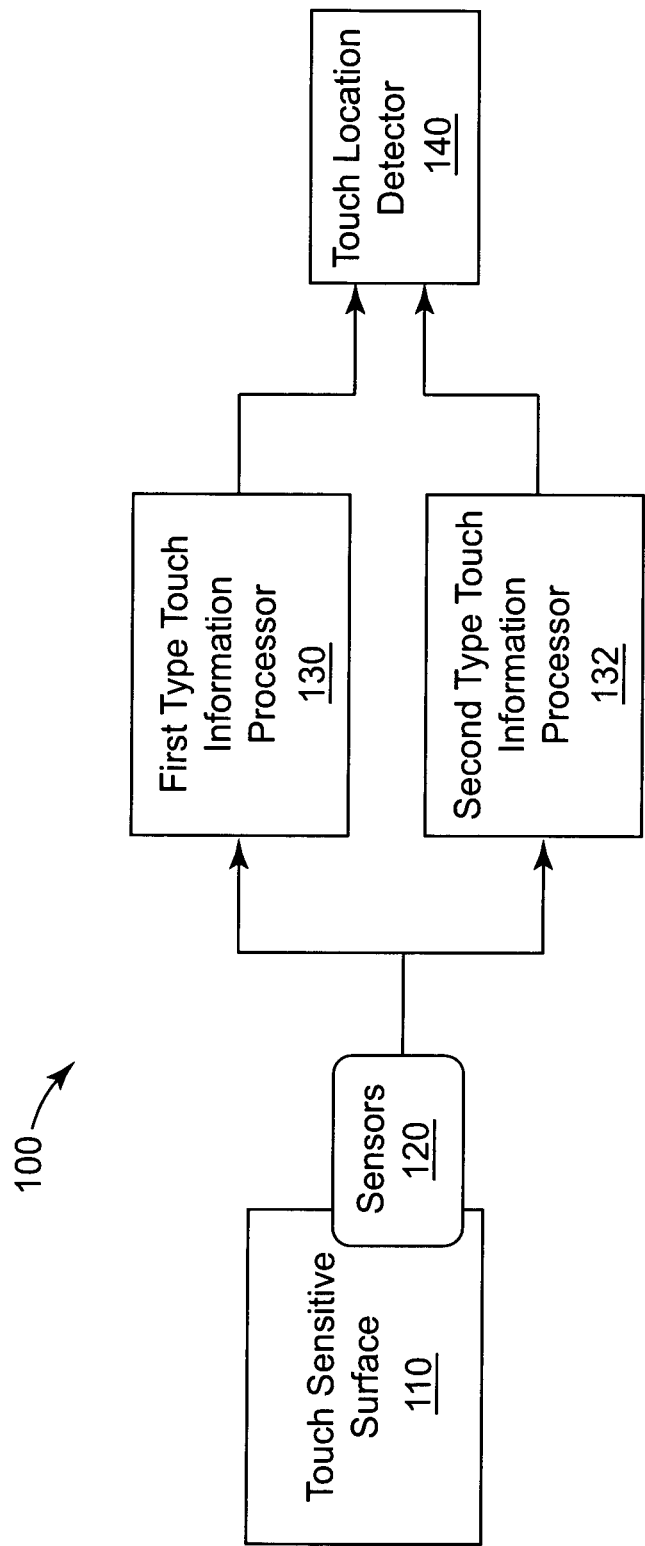
FIGS. 1B and 1C illustrate generalized diagrams of touch sensitive devices in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

Each type of touch technology or touch location process has certain strengths and weaknesses. Parameters derived from two or more touch techniques or processes may be combined to enhance touch location determination over that which is possible using a single technique. Embodiments of the invention are directed to combining a plurality of distinct touch location processes to enhance the determination of a touch location on a touch panel. Some embodiments described herein involve the use of two or more touch location processes utilizing different types of touch location technology. Other embodiments involve the use of two or more touch location processes that use the same type of touch location technology, but use different methodologies for determining touch location.

Touch location may involve determining the location of a static touch and/or determining the path of a dynamically moving touch, such as the motion used in a dragging, drawing or writing operation. Dynamic touch measurements may involve streaming data before, during, and/or after touch down. Touch information may include position information for a touch on a plane surface, for example, the x and y coordinates of the touch position on a flat panel. Further, touch location determination may involve acquiring z-axis information. For clarity, a convention can be used whereby a z-axis value less than zero indicates hover (higher negative values indicating greater distance from the touch surface), and a z-axis value of zero or greater indicates touching of a touch surface, the z-value increasing with greater applied touch force. Z-axis touch information may include, for example, touch down and/or lift off detection, touch down and/or liftoff speed, distance above the touch panel and/or level of touch pressure on the touch panel.

Noise in the touch signals may lead to inaccuracies in touch location determination. For example, noise may be caused by electrostatic discharge, electromagnetic interference, vibration, torsion, ambient light, noise from a display unit, acoustic noise, surface contamination, and/or other noise sources. Noise rejection may be an important factor for the touch location process. Some touch location processes have decreased sensitivity to noise from certain sources. In some embodiments, touch location processes may be combined to increase noise immunity.

Touch location processes are associated with various process parameters such as the accuracy of the touch location measurement, the resolution of the measurement, the speed at which the measurement may be acquired, and the resources consumed by the touch location process, for example, power and/or processor time consumed. A single touch location process may provide superior performance with respect to one of the above touch location parameters. However, a particular touch location process may not be optimal for measuring all touch parameters under all conditions.

A combination of touch location processes, as illustrated by embodiments of the invention described herein, may be advantageously used to yield superior performance with respect to a plurality of the above parameters. Information from two or more touch location processes may be combined to enhance one or more of these or other process parameters. Combining the results of multiple independent processes for determining touch location provides a number of advantages over the use of a single process. For example, the combination approach to touch location determination described herein may provide any or all of the following advantages: increased touch location accuracy, decreased complexity of touch location computations, increased speed in touch location determination, decreased power consumption, increased touch location sensitivity, increased immunity to noise and/or enhanced z-axis information.

FIG. 1A is a diagram illustrating a method of touch location determination in accordance with embodiments of the invention. Information related to the touch location is acquired from a plurality of independent processes 151, 152, 153. The independent processes 151, 152, 153 may involve, for example, the use of the same type of sensors operating in a plurality of modes. Alternatively, the independent processes may involve the use of different types or sensors. Information related to touch location acquired using a first process is used to enhance 160 the information related to the touch location acquired by a second process. The touch location is determined 170 using the enhanced information.

Figure 1C:
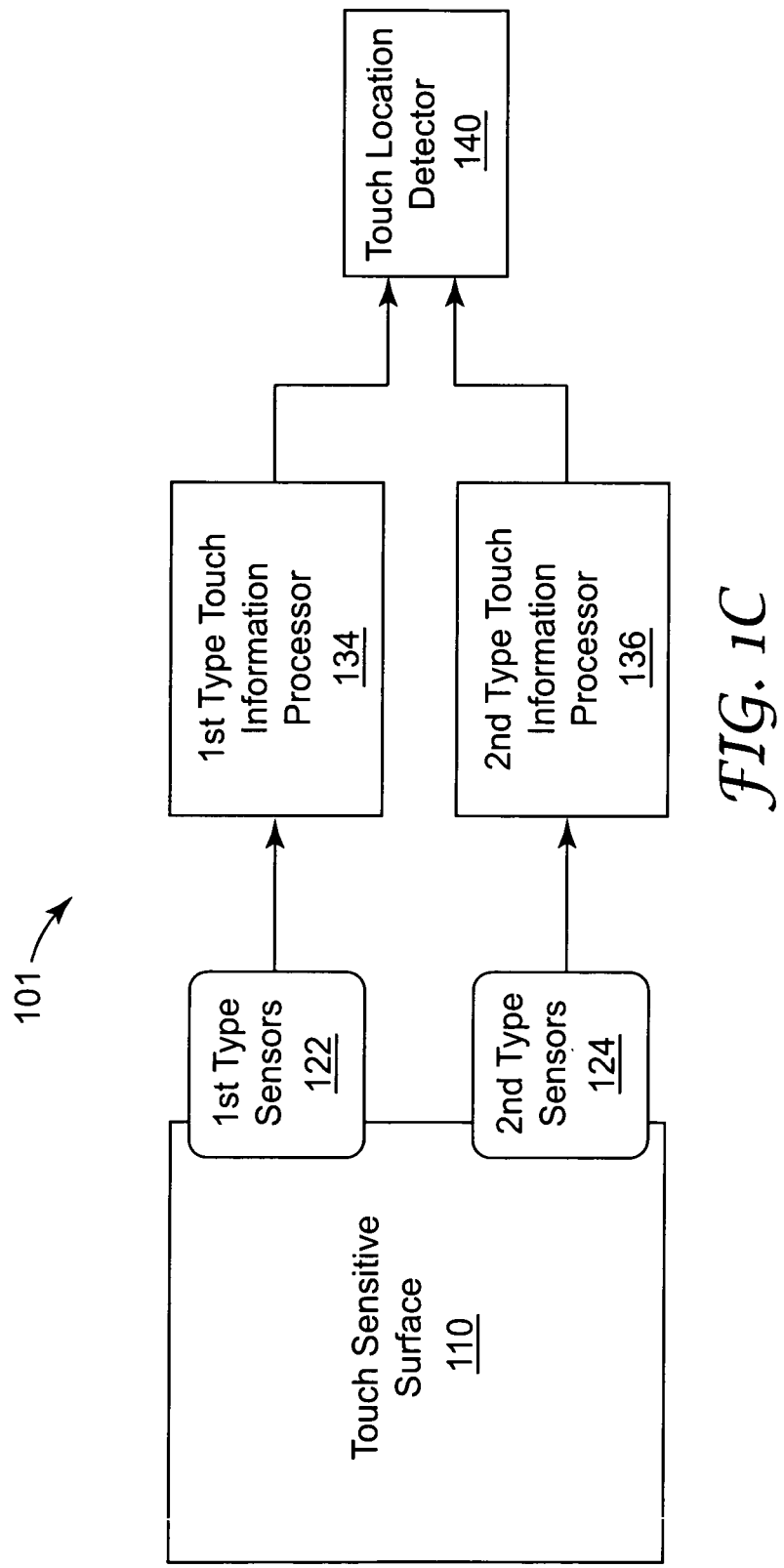

Generalized diagrams of touch sensitive devices 100, 101 in accordance with embodiments of the invention are illustrated in FIGS. 1B and 1C. In the implementation illustrated in FIG. 1B, the same type of sensors 120 are used by two independent methodologies to acquire touch information. The configuration of the touch sensitive surface 110 and the arrangement of the sensors 120 with respect to the touch sensitive surface 110 may vary according to the type of sensor technology. For example, in some embodiments, four sensors may be disposed at the corners of a rectangular touch sensitive surface. The sensors 120 are capable of producing a first type of signal when operating in a first mode and a second type of signal when operating in a second mode. For example, when operating in a first mode, piezoelectric sensors generate signals modulated by bending waves created by a touch on a touch sensitive surface. When operating in a second mode, the piezoelectric sensors generate signals modulated by static plate bending. The plate bending signals may be used to enhance the touch location determination based on the bending wave signals.

The touch sensitive device 100 illustrated in FIG. 1B includes processors 130, 132 for processing the sensor signals. A first processor 130 processes signals generated by the sensors 120 according to a first methodology when the sensors 120 operate in the first mode. A second processor 132 processes the sensor signals according to a second methodology when the sensors 120 operate in a second mode. A touch location detector 140 uses information from the sensor signals generated when the sensors operate in the second mode to enhance the touch location process that utilizes the sensor signals generated when the sensors operate in the first mode.

FIG. 1C illustrates another implementation of a touch sensitive device 101 in accordance with embodiments of the invention. The touch sensitive device 101 uses two types of touch sensors 122, 124. For example, a first type of sensor may comprise an optical touch sensor and the second type of sensor may comprise a force touch sensor. The sensor signals generated by the two types of sensors 122, 124 are independently processed by separate processors 134, 136. The touch location detector 140 uses information from signals generated by the second type sensor 124 to enhance the touch location determination performed using information acquired using the first type sensor 122. The processors 130, 132, 134, 136 of FIGS. 1B and 1C illustrate functional blocks that may be illustrated in hardware, software, firmware, or a combination thereof.

In some embodiments, a first type of touch sensor may be used to detect an impending touch (pre-touch) and measure a coarse touch position while a finger or touch stylus hovers over the touch sensitive surface ($z<0$). Signals from sensors of a second type may be used to determine the final touch location, typically when $z>0$. The touch location detector may use the coarse touch location information acquired by the pre-touch sensors (sensors of the first type) to enhance the touch location information produced by the touch sensors (sensors of the second type).

Figure 2A:
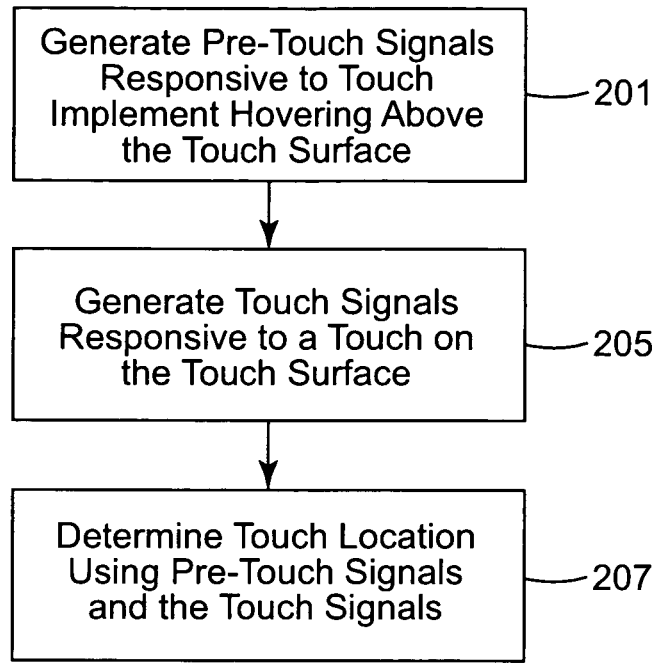
FIGS. 2A and 2B are a flowcharts illustrating methods of using impending touch sensing to enhance touch location determination in accordance with embodiments of the invention.

FIG. 2A is a flowchart illustrating a method of using impending touch sensing to enhance touch location determination in accordance with embodiments of the invention. One or more pre-touch sensors are used to generate 201 pre-touch signals prior to a touch implement touching the panel. After touch down of the touch implement (z greater than or equal to 0), one or more touch sensors generate 205 touch signals responsive to the touch on the touch panel. The location of the touch is determined 207 using both the touch signals and the pre-touch signals.

Figure 2B:
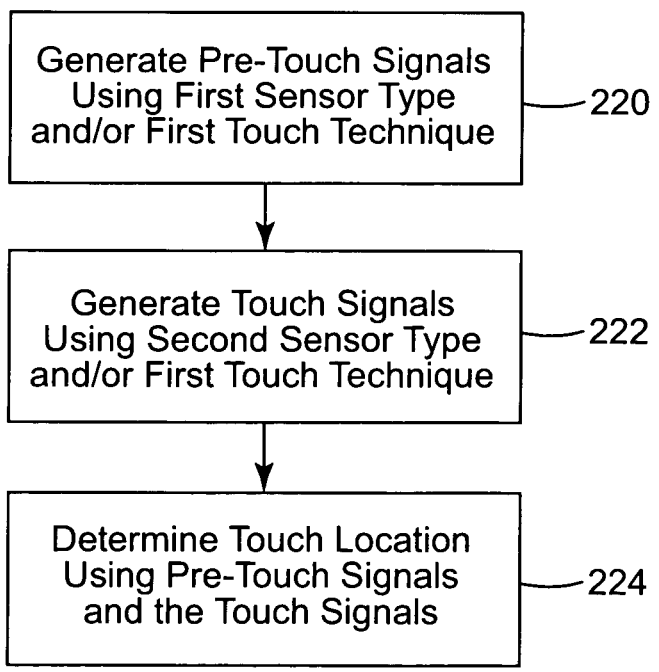

In various embodiments, impending touch sensing may involve sensors and/or sensing methodologies of the same type or a different type from the touch sensing sensors and/or methodologies. This concept is illustrated by the flowchart of FIG. 2B. Pre-touch signals are generated 220 using a first sensor type and/or a first methodology. Touch signals are generated 222 using a second sensor type and/or a second methodology. The location of the touch is determined 224 using the pre-touch signals and the touch signals.

Figure 3A:
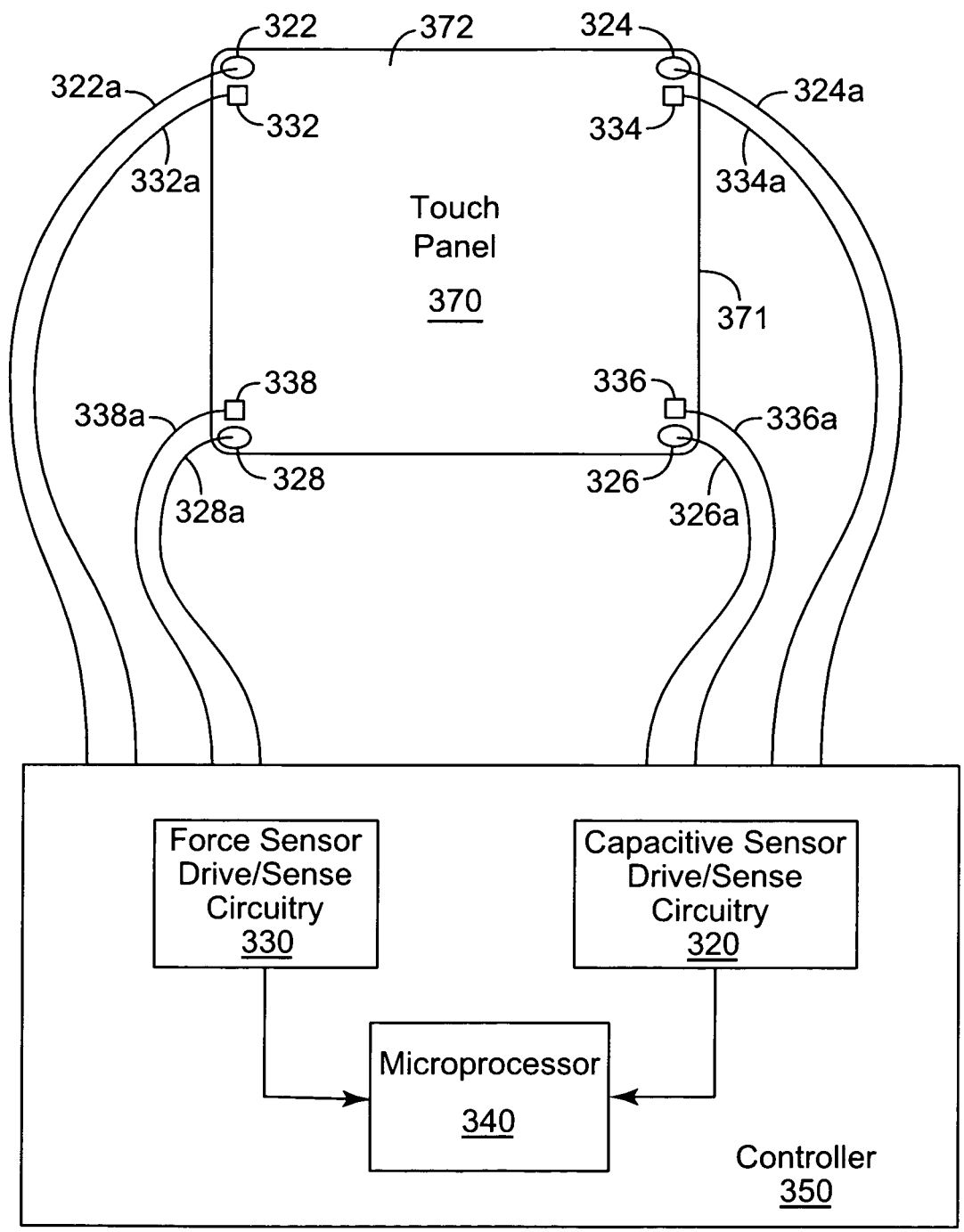
FIG. 3A illustrates a block diagram of a touch sensing system capable of sensing and using pre-touch and touch information for touch location determination in accordance with embodiments of the invention.

FIG. 3A illustrates a block diagram of a touch sensing system that is capable of sensing impending touch and touch conditions and using pre-touch and touch information in accordance with embodiments of the invention. In this example, impending touch sensing is accomplished using a capacitive sensor and touch sensing is accomplished using force sensors. FIG. 3A shows a touch sensing system that includes a capacitive touch panel 370 and also incorporating four force sensors 332, 334, 336, 338 arranged at the corners of the rectangular touch panel 370. The capacitive touch panel 370 and the force sensors 332, 334, 336, 338 are electrically coupled to a controller 350. The capacitive touch panel 370 includes a substrate, such as glass, which has top 372 and rear 371 surfaces respectively provided with an electrically conductive coating. The top surface 372 is the primary surface for sensing impending touch and touch conditions. The top surface 372 is nominally driven with an AC voltage in the range of about 1 V to about 5 V.

The capacitive touch panel 370 is shown to include four corner terminals 322, 324, 326, 328 to which respective wires 322a, 324a, 326a, 328a are attached. Each of the wires 322a, 324a, 326a, 328a is coupled to the controller 350. The wires 322a, 324a, 326a, 328a connect their respective corner terminals 322, 324, 326, 328 to respective drive/sense circuits of the capacitive sensor drive/sense circuitry 320 provided in the controller 350.

The controller 350 controls the voltage at each of the corner terminals 322, 324, 326, 328 via capacitive sensor drive/sense circuitry 320 to maintain a desired voltage on the top surface 372. A finger or other touch implement hovering above the top surface 372 is detected as an effective small capacitor applied at the top surface 372. The hovering touch implement produces a change in current flow measurements made by the controller 350 via capacitive drive/sense circuitry 320. The controller 350 measures the changes in currents at each corner terminal 322, 324, 326, 328 caused by the change in capacitance. The controller 350 may use the capacitance change to detect hover, determine impending touch location, and/or measure the proximity of the hovering touch implement from the top surface 372 based on the relative magnitudes of the corner currents. The Z-axis proximity of the hovering implement may be determined as a function of the change in current as the hovering implement approaches the top surface 372. Hover detection, i.e., the recognition that an implement is hovering above the top surface 372 may occur, for example, if the change in current exceeds a predetermined limit. The X,Y position of the impending touch hover location may be determined using Equations 1 and 2 below.

$$XH=(UR+LR-UL-LL)/(UR+LR+UL+LL) \quad \text{Equation 1}$$

$$YH=(UR+UL-LR-LL)/(UR+LR+UL+LL) \quad \text{Equation 2}$$

where UL, LL, LR, UR are signal currents measured at the upper left, upper right, lower right, lower left corner terminals 322, 324, 326, 328, respectively.

The force sensors 332, 334, 336, 338 are used to determine the touch location after the touch implement comes in contact with the touch surface, and where z is greater than a threshold value, an event referred to as touch down. The force sensors 332, 334, 336, 338 are located proximate to the rear surface 371 of the touch panel 370 at respective corners of the touch panel 370. As a stylus, finger or other touch implement presses the touch surface 372, a touch force is exerted upon the touch surface 372. The touch force acts on the force sensors 332, 334, 336, 338 in an amount that can be related to the location of the force application.

The forces on the force sensors 332, 334, 336, 338 cause a change in the signals generated by the force sensors 332, 334, 336, 338. The force sensors 332, 334, 336, 338 are coupled through wires 332a, 334a, 336a, 338a to force sensor drive/sense circuitry 330 in the controller 350. The controller 350 measures the changes in signals generated by each of the force sensors 332, 334, 336, 338 caused by the change in touch force. The controller 350 may use the signal changes to detect touch down, determine touch location, and/or measure the Z-axis force of the touch implement on the top surface 372. The Z-axis force of the touch implement on the touch surface 372 may be determined as a function of the sum of the forces as indicated by Equations 3 and 4 below. Touch down may occur, for example, if the total force, $F_{Tz}$, exceeds a predetermined limit.

Calculation of the touch location may be performed, for example, using combinations of the force sensor signals. The signals generated by the force sensors 332, 334, 336, 338 may be used to calculate various touch-related signals, including the moment about the y-axis, $M_y$, moment about the x-axis, $M_x$, and the total Z-axis force, $F_{Tz}$. The coordinates of the touch location may be determined from the force sensor signals, as provided in Equations 3 and 4:

$$XT=(URF+LRF-ULF-LLF)/(URF+LRF+ULF+LLF) \quad \text{Equation 3}$$

$$YT=(URF+ULF-LRF-LLF)/(URF+LRF+ULF+LLF) \quad \text{Equation 4}$$

where XT and YT are force-based touch coordinates and URF, LRF, ULF, LLF are the forces measured by the upper right 334, lower right 336, upper left 332, lower left 338 sensors, respectively.

In one embodiment, the impending touch location determined using the capacitive sensor may be used as a lower accuracy "coarse" touch location during the final touch location process. The coarse touch location may be used to simplify and/or accelerate the calculation of a more accurate "finer" touch location using the force sensors.

Lower accuracy during hover may have fewer detrimental consequences than lower touch location accuracy. Lower accuracy in hover location may be of less consequence because the user may not be performing any operations that require higher accuracy. For example, the user may be moving a cursor or cross-hair around based on the hover location. In this scenario, the consequences for lower accuracy during hover are minor. Further, because a displayed cursor may be tracking the hover movements, the user has visual confirmation of where the system has determined the hover position to be, and can adjust the position. An advantage of obtaining a location during hover, even if it is a low accuracy location, is that the hover location defines a relatively small region on a much larger touch surface where the touch is expected to land.

Detection of a z-axis value (and a touch down) may be more reliably detected by a combination of two independent sensors and/or methods. Each method may have sources of error that are mitigated by the use of the other method. For example, analog capacitive touch systems may have difficulty resolving hover location in the presence of significant "hand shadow" whereby the hover location is influenced by capacitance from a finger in proximity, (desirable) and also by a hand in proximity to the touch surface, (undesirable, as it introduces an error in finger location measurement). When hand shadow is included in the touch measurements, it may introduce an error in capacitive measurements of touch location. Force systems are not subject to hand shadow, so hand shadow-induced errors in capacitive measurement can be corrected by the force measurement.

The controller may use signals generated by the pre-touch sensors and/or the touch sensors to implement various processes in addition to determining touch location. For example, the controller 350 may activate and deactivate the touch location circuitry based on the pre-touch sensor signals. Deactivating touch location circuitry until it is needed conserves device power which may be particularly important for battery-powered portable devices.

Figure 3B:
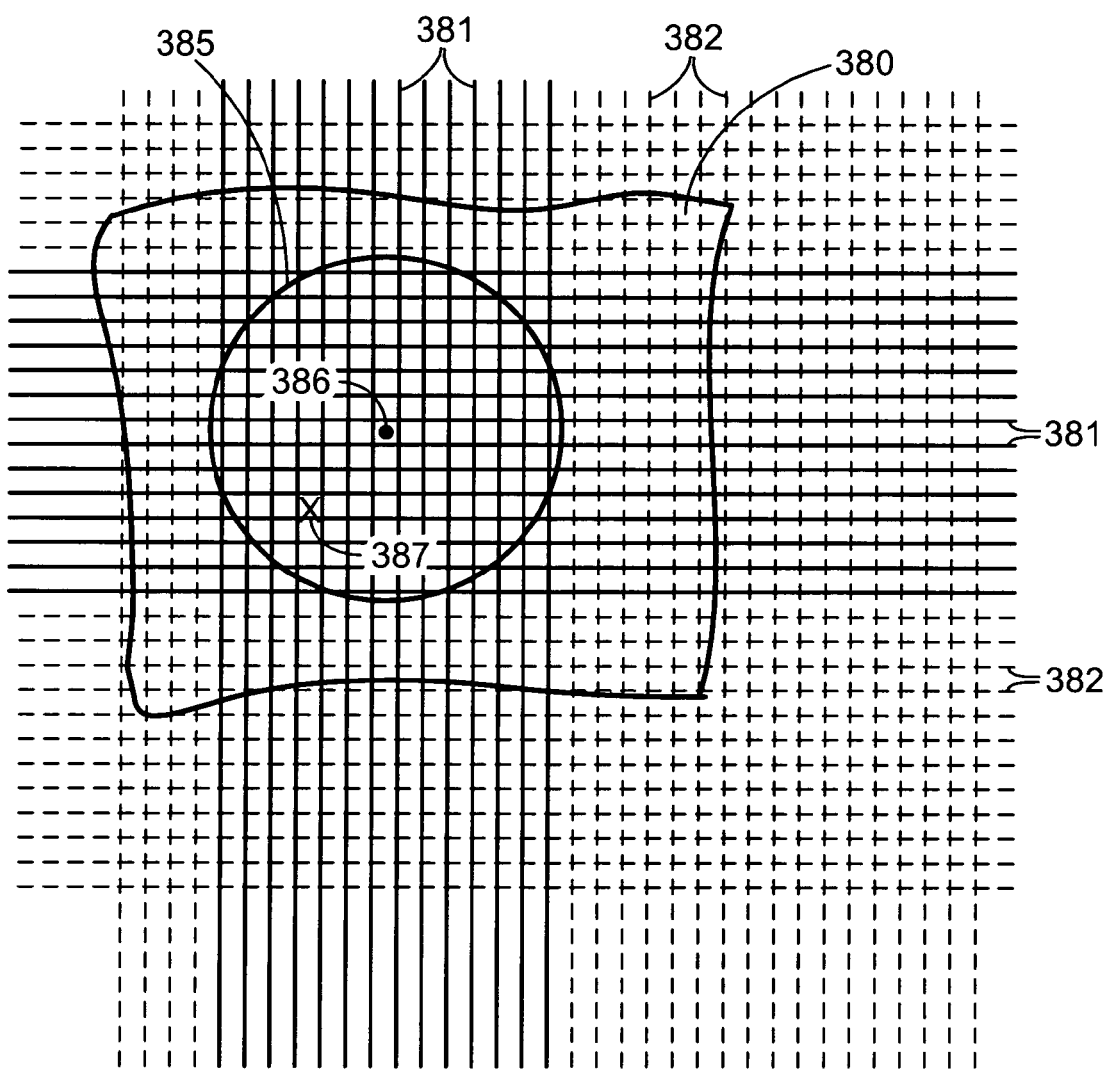
FIG. 3B is a diagram illustrating the use of pre-touch information to enhance touch location determination in accordance with embodiments of the invention.

An example of the use of pre-touch information to enhance touch location determination is illustrated by FIG. 3B. FIG. 3B conceptually illustrates a portion of a surface 380 of a matrix capacitive touch sensor. Matrix capacitive touch sensors include a grid of transparent, conductive material, such as indium tin oxide (ITO), or other suitable conductors. The controller (not shown) accesses each of the gridlines 381, 382 to determine if a change in capacitance has occurred. A change in capacitance indicates an impending or presently occurring touch.

In accordance with embodiments of the invention, the pre-touch information may be used, prior to touch down, to define an area 385 of the touch panel where the touch is likely to occur. In this embodiment, the hover location 386 is determined and an area 385 about the hover location 386 is computed. The controller then tests only the gridlines 381 that are associated with that area 385. The remaining gridlines 382 are not tested because the touch is not expected to occur at a location associated with these gridlines 382. In this example, the use of the pre-touch hover location speeds the touch location determination by reducing the amount of processing required to determine the touch location.

Another implementation illustrating the use of an initial coarse touch location to enhance touch location determination is described in commonly owned U.S. patent application Ser. No. 11/032,572, which is incorporated herein by reference. The referenced patent application describes an iterative method for deriving touch location. The concepts of the referenced patent application, as applied to the present invention, for example, may involve the use of the initial "coarse" location acquired using a capacitive pre-touch sensor, or other type of pre-touch sensor. Successive iterations of touch location may be implemented based on the information acquired from the pre-touch sensor signals.

Although the examples provided in FIGS. 3A and 3B illustrate examples of a capacitive sensor used for acquiring pre-touch information and capacitive or force sensors for acquiring touch information, various types of sensors may be used to acquire pre-touch information and touch information. Sensors used to sense impending touch and/or touch conditions, may include, for example, various types of capacitive sensors, force sensors, surface acoustic wave (SAW) sensors, bending mode sensors, infrared sensors, optical LCDs, resistive sensors, and/or other touch sensor types.

For example, in various embodiments, capacitive sensors may be combined with force sensors, bending wave acoustic sensors, infrared (IR) sensors, resistive sensors, or force sensors to sense impending touch and touch conditions. Capacitive or optical sensors may be used to provide pre-touch location coordinates and force, capacitive, SAW, IR or other sensors may be used to detect touch down and to measure more accurate touch location coordinates. Matrix capacitive sensors may detect proximity and measure a coarse position during hover. Optical methods, including optically sensitive LCDs may detect proximity and measure a coarse position during hover. Force sensors, resistive sensors, SAW sensors, or bending wave sensors, or other types of touch sensing systems, may be augmented with a capacitive or optical proximity sensor that detects the presence of a person within a predetermined range of the touch panel. The presence of the person may activate the display of an audiovisual program, or other processes, for example.

Figure 3C:
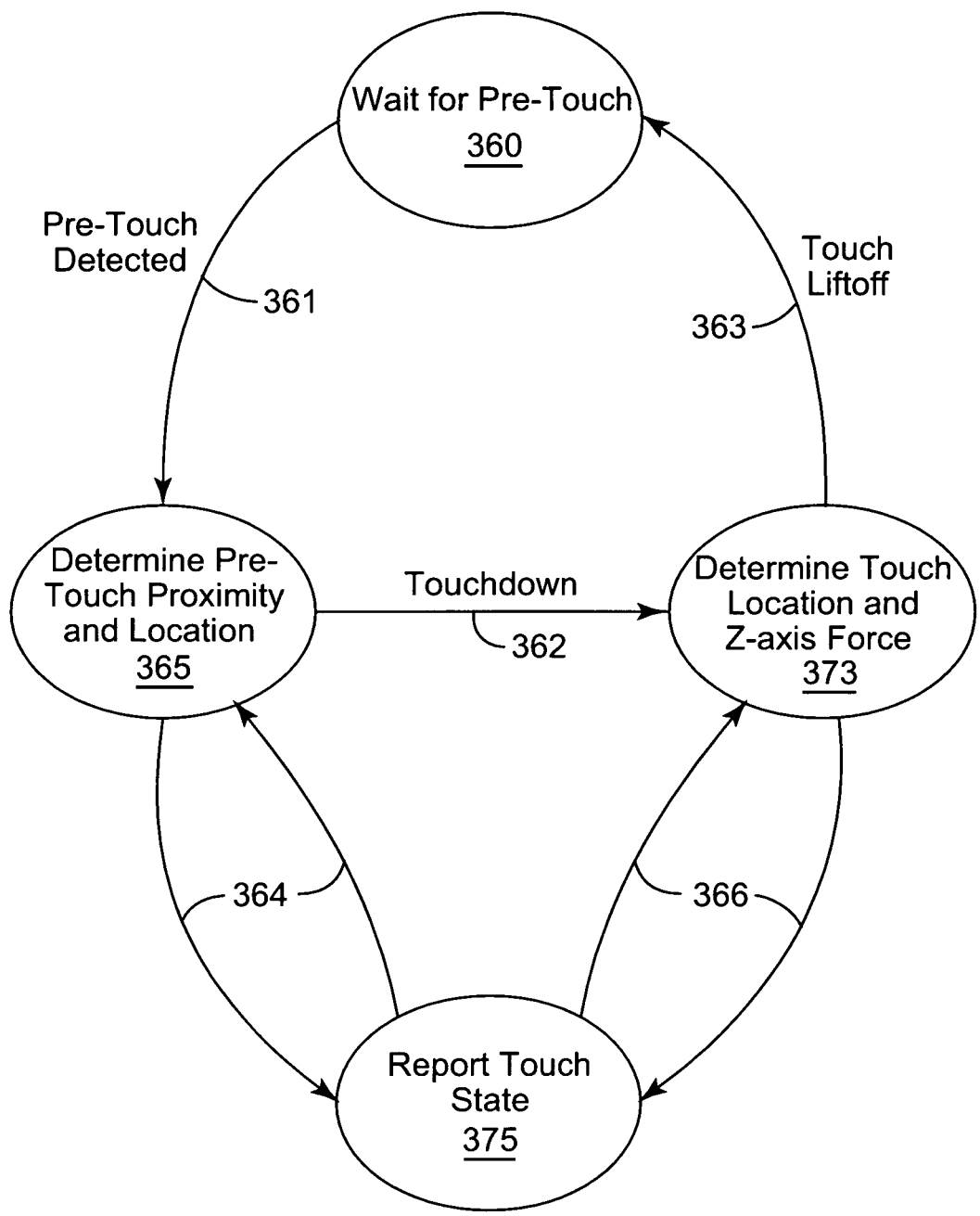
FIG. 3C is a state diagram that conceptually illustrates the operation of a touch sensing system in accordance with embodiments of the invention.

A touch sensing system that is capable of impending touch sensing and touch sensing may be used to report the X and Y-axis coordinates of the pre-touch location, the X and Y-axis coordinates of the touch location, and/or Z-axis information ranging from measured proximity from the touch panel surface to measured touch force exerted on to the touch panel surface. FIG. 3C is a state diagram that conceptually illustrates the operation of a touch sensing system in accordance with embodiments of the invention. Prior to detecting a pre-touch condition (touch implement hovering above the touch surface) the touch sensing system remains in a wait state 360. After detecting the pre-touch condition, the system transitions 361 to a mode 365 wherein the system determines pre-touch proximity and may also determine pre-touch location. The system may periodically 364 update and report 375 the current touch state, including pre-touch proximity and/or pre-touch location to a host computer.

Touch down and lift off detection may depend on various factors including the sensors and/or processes used for touch determination. Touch down/lift off criteria may vary, for example, based on the environmental conditions of the touch sensor, the type of touch implement used, and/or other factors. In various embodiments, touch down and/or lift off may involve detecting a net signal magnitude, a rate of change, or other signal characteristics. Touch down may be detected, for example, when the touch implement comes within a predetermined distance of the touch surface or exerts a predetermined amount of force on the touch surface or when touch signals exceed a predetermined level. Touch lift off may be detected, for example, when the touch force is less than a predetermined value or when the touch implement is beyond a predetermined distance from the touch surface. Touch down and lift off thresholds may be preset, may be altered manually by the user or dynamically by the system.

After touch down is detected, the system transitions 362 to a mode 373 wherein the system determines touch force and touch location. The system may periodically 366 update the current touch state, including touch force and touch location, and report 375 the current touch state to the host computer. Following touch lift off, the system transitions 363 to the wait state 360.

Figure 4A:
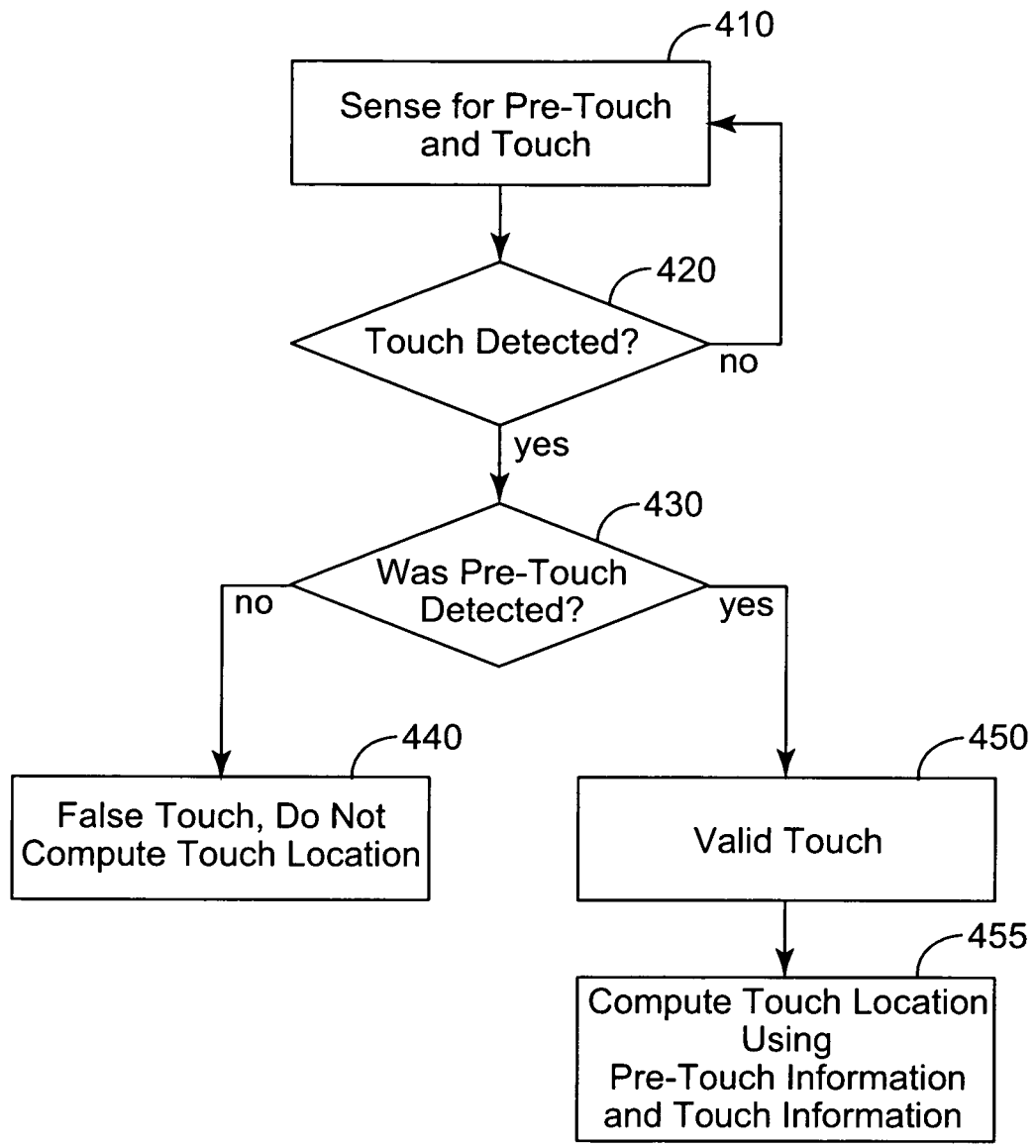
FIG. 4A is a flowchart illustrating a method of using pre-touch information to confirm that a valid touch has occurred in accordance with embodiments of the invention.

In some scenarios, a touch sensing device may erroneously detect a touch when none is present. This may occur, for example, due to various conditions, such as wind blowing on the touch panel, bending or torsion of the touch panel due to handling, or other factors. In accordance with some embodiments, the touch sensing system may use pre-touch information to confirm that a valid touch has occurred. Such an implementation is illustrated by the flowchart of FIG. 4A. Initially, the system senses for 410 a touch implement hovering above the touch panel and touch on the touch panel. If a touch is detected 420, the system checks 430 to see if a hovering implement was previously detected. If the hovering implement was previously detected 430, the system determines that the touch is valid 450 and calculates 455 touch location based on pre-touch information and touch information. The touch location calculation may use pre-touch location information to increase the speed, increase the accuracy, and/or decrease the processing complexity of the final touch location computation as described herein. If the hovering implement was not previously detected 430, then the touch may be determined to be a false touch and touch location is not calculated 440, or additional measurements may be done to confirm a valid touch, or a higher signal threshold may be required to confirm a valid touch.

Figure 4B:
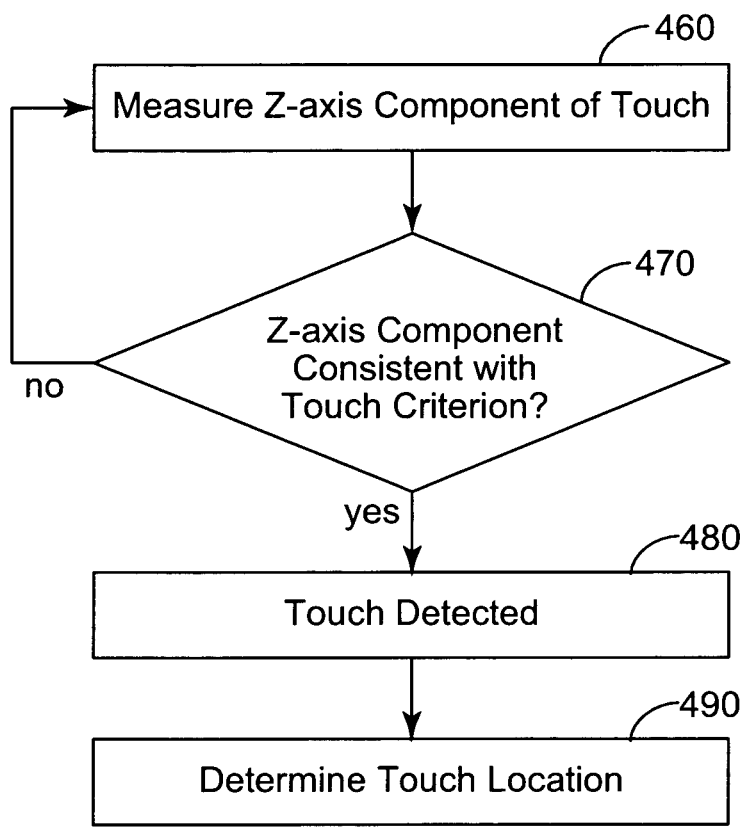
FIG. 4B is a flowchart illustrating touch down and/or lift off detection in accordance with an embodiment of the invention.

According to some embodiments, the touch sensing system has the capability of measuring Z-axis information including both pre-touch distance from the touch surface prior to the touch implement making contact with the touch panel and touch force on the touch panel after contact. In these embodiments, touch down and/or lift off may be detected, for example, when the Z-axis component is consistent with a Z-axis touch down and/or lift off criterion. FIG. 4B is a flowchart illustrating this implementation.

The Z-axis component of the touch is measured 460, including both pre-touch distance from the touch surface and touch force on the touch surface. In one implementation, pre-touch distance may be measured using one sensor type and touch force may be measured using a second sensor type. If the Z-axis component is consistent 470 with a touch down criterion, then the touch is detected 480. The touch criterion may be selectable from a range including a distance from the touch surface to an amount of force applied to the touch surface. After touch down is detected 480, the X,Y touch location is determined 490. In some implementations, X,Y touch location determination may make use of both pre-touch down and post-touch down information as described herein.

Additionally, the rate of change of the z-axis component may be used as a touch down criterion, or to modify other touch down criteria. For example, a capacitively measured pre-touch signal magnitude may increase rapidly, indicating an approaching touch implement. The rate of change of pre-touch z (distance above the touch surface) will typically go sharply negative at the moment of touch down, and the rate of change of applied force will increase rapidly at the same moment of touch down. A deviation from this typical touch profile may indicate a false touch or that additional testing is required to confirm a valid touch down. A rapid change in force not preceded by an appropriate pre-touch signal magnitude change may indicate a (non-touch) acoustic wave has impacted the touch screen surface, or that the touch panel system has undergone a non-touch acceleration such as a tap to the bezel or shaking of the display system.

Figure 5A:
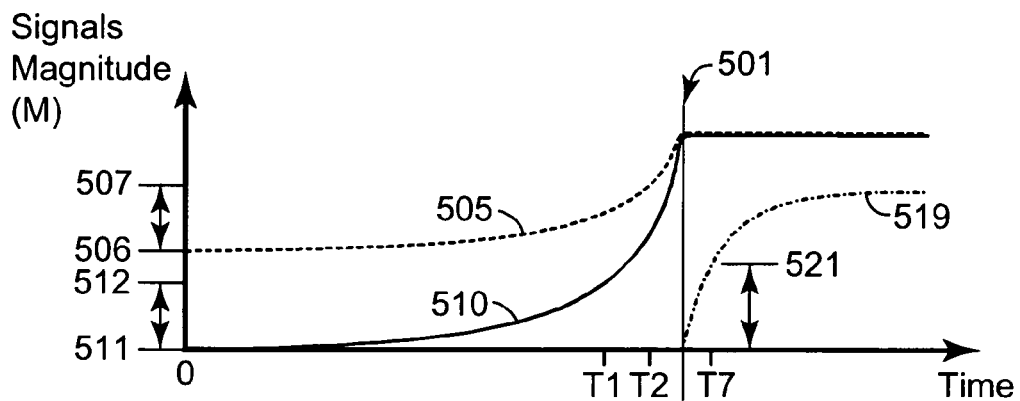
FIGS. 5A-5C show graphs of signal vs. time associated with two touch down events.
Figure 5B:
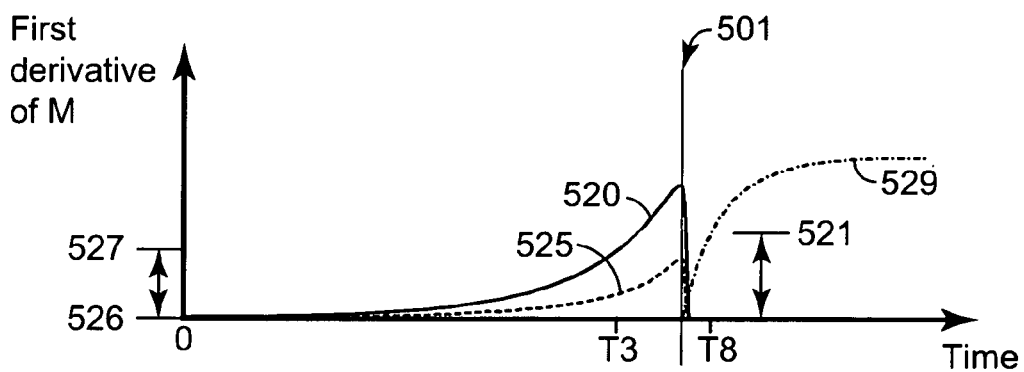
Figure 5C:
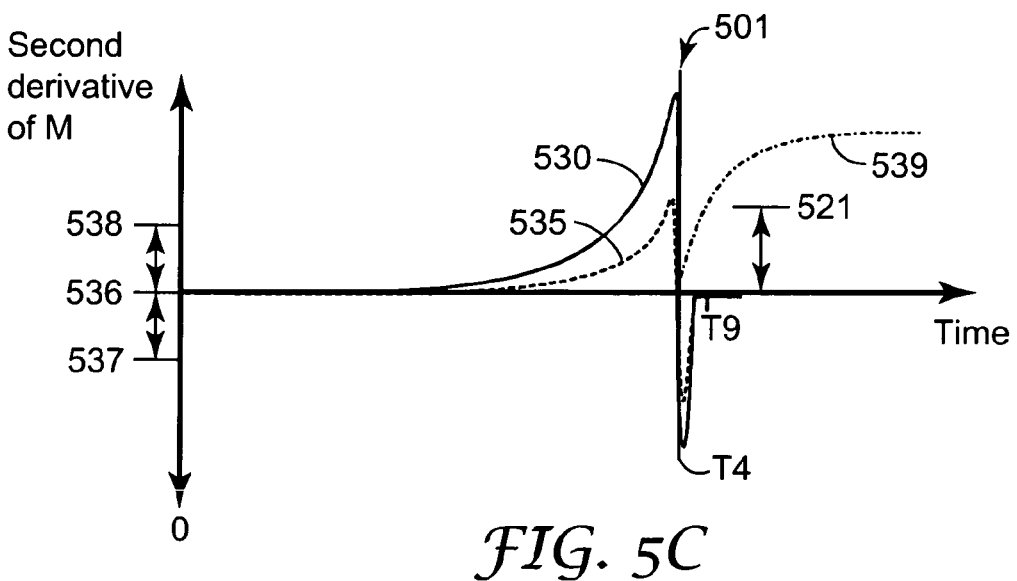

FIGS. 5A-5C show graphs of signal vs. time associated with two touch down events. Pre-touch signals are measured by an analog capacitive method. Touch down is measured using capacitive signals and also by a force based touch method. Time 501 indicates the time of touch down.

In FIG. 5A, graphs 505, 510 illustrate two types of pre-touch conditions. Signal 510 represents capacitive signal magnitude generated by a touch that rapidly approaches the touch surface from a large distance, and moves steadily until it impacts the touch surface at time 501. Signal 510 flattens after touch down, and force signal 519 increases from zero at touch down exceeding the touch force threshold level 521 at T7. Capacitive touch is often detected as a rapid level change exceeding a threshold, represented by the difference in magnitude between base level 511 and touch threshold 512. Signal 510 exceeds threshold 512 at time T1.

Signal 505 shows a different pre-touch condition where a touching implement hovers above a touch surface for a sufficient time that the capacitive touch threshold base level 506 is adjusted to equal level 506, and threshold 507 is adjusted correspondingly. Signal 505 still exceeds threshold 507 at time T2. One example of long-duration hover is in gaming systems where players remain poised close to a touch surface so they may quickly touch icons that flash on a display.

Curves 520 and 525 of FIG. 5B are first derivatives of signals 510 and 505 respectively. The peak levels of 520 and 525 may be used to detect touch down, for example if curve 520 or 525 exceeds threshold 527 at time T3, a touch down may be determined. The base level adjustment method shown in graph 500 may not be applied to the first derivatives situation. Thus the threshold is not adjusted to compensate for the long-duration hover situation described above, and the touch corresponding to curve 525 may not be detected by the first derivative method. Force signal 529 increases from zero at touch down, exceeding force threshold 521 at T8 so the force measurement may detect a touch that is not detected by capacitive methods.

Curves 535 and 530 of FIG. 5C are the second derivatives of curves 505 and 510 respectively. As with the first derivative, adjustment of base 536 may not be practical so threshold 537 may be fixed. Threshold 537 is at a negative level so it measures the deceleration of capacitive signals 505 or 510. A touch may be detected at T4 when the second derivative curve exceeds in a negative direction the threshold 537. A touch may also be detected using threshold 538, or the combination of exceeding thresholds 538 and 537 may be required to determine a valid touch down. In addition, signal 505 exceeding threshold 507, and/or curve 525 exceeding threshold 527, and/or force signal 539 exceeding threshold 821 at time T9 may provide additional criteria for a valid touch down.

Various methods of combining pre-touch and touch location processes for enhanced touch location determination are described in commonly owned U.S. patent application Ser. No. 11/116,576, incorporated herein by reference.

In some embodiments, the same type of touch sensor may be used to implement two touch location methodologies employed synergistically to enhance the touch location determination. Information acquired from the first methodology, e.g., coarse touch position, may be used to enhance the determination of the touch location via the second methodology.

In some embodiments, the first and second methodologies may involve the use of passive measurement of bending and/or vibration waves in a touch panel. The term bending wave vibration refers to an excitation, for example by the contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves. The term bending may also apply to out of plane displacement or deflection of a member when subject to loading, such as when a touch panel deflects (e.g., is subject to bowing) in response to a touch applied to the surface of the touch panel. In this regard, one surface of the touch panel is placed in compression, while the opposing surface is placed in tension, which results in bowing of the touch panel. Such bowing of the touch panel may be detected using bending mode sensors of a type described herein and in a manner discussed herein.

In vibration sensing touch input devices that include piezoelectric sensors, for example, vibrations propagating in the plane of the touch panel plate stress the piezoelectric sensors, causing a detectable voltage across the sensor. The signal received can be caused by a vibration resulting directly from the impact of a direct touch input or the input of energy due to a trace (friction), or by a touch input influencing an existing vibration, for example by attenuation of the vibration. The signal received can also be caused by an unintended input, such as an input resulting from user handling or mishandling of the touch input device, or from environmental sources external to, but sensed by, the touch input device.

Figure 6:
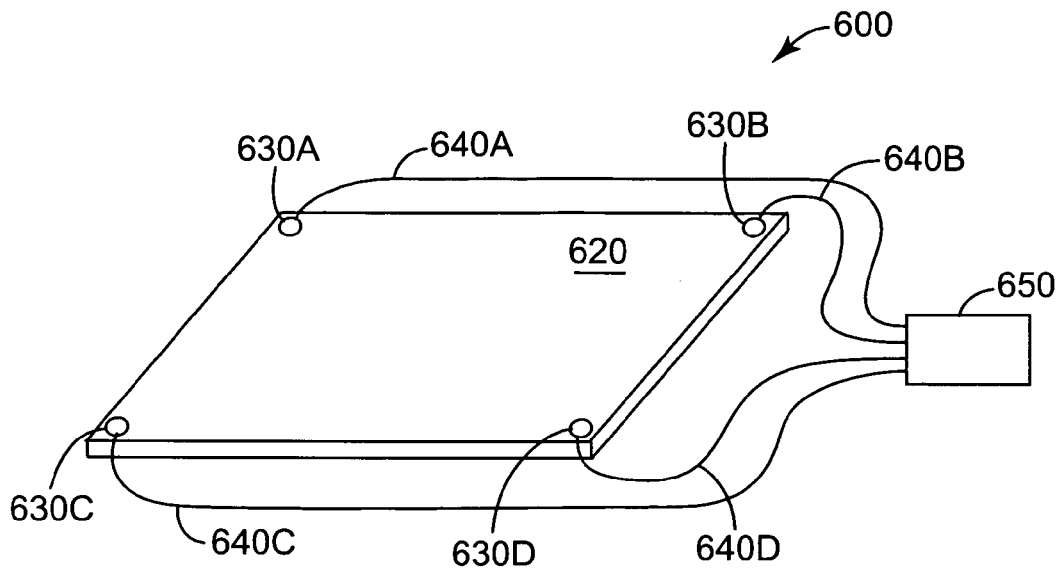
FIG. 6 is a diagram illustrating a touch sensitive device that incorporates features and functionality for detecting bending wave vibrations and determining touch location using a multiplicity of disparate touch location detection techniques in accordance with embodiments of the invention.

Turning now to FIG. 6, there is illustrated one configuration of a touch sensitive device 600 that incorporates features and functionality for detecting bending wave vibrations and determining touch location using a multiplicity of disparate touch location detection techniques. According to this embodiment, the touch sensitive device 600 includes a touch substrate 620 and vibration sensors 630 coupled to an upper surface of the touch substrate 620. In this illustrative example, the upper surface of the touch substrate 620 defines a touch sensitive surface. Although sensors 630 are shown coupled to the upper surface of the touch substrate 620, the sensors 630 can alternatively be coupled to the lower surface of the touch substrate 620. In another embodiment, one or more sensors 630 may be coupled to the upper surface while one or more other sensors 630 may be coupled to the lower surface of the touch substrate 620. The vibration sensors 630A-630D can be coupled to touch plate 620 by any suitable means, for example using an adhesive, solder, or other suitable material, so long as the mechanical coupling achieved is sufficient for vibrations propagating in the touch plate can be detected by the vibration sensors. Exemplary vibration sensors and vibration sensor arrangements are disclosed in co-assigned U.S. patent application Ser. No. 10/440,650 and U.S. Ser. No. 10/739,471, which are fully incorporated herein by reference into this document.

Touch substrate 620 may be any substrate that supports vibrations of interest, such as bending wave vibrations. Exemplary substrates 620 include plastics such as acrylics or polycarbonates, glass, or other suitable materials. Touch substrate 620 can be transparent or opaque, and can optionally include or incorporate other layers or support additional functionalities. For example, touch substrate 620 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 600 includes at least three sensors 630 to determine the position of a touch input in two dimensions, and four sensors 630 (shown as sensors 630A, 630B, 630C, and 630D in FIG. 6) may be desirable in some embodiments, as discussed in International Publications WO 2003/005292 and WO 01/48684, and in co-assigned U.S. patent application Ser. No. 09/746,405, which is fully incorporated herein by reference into this document.

In the present invention, sensors 630 are preferably piezoelectric sensors that can sense vibrations indicative of a touch input to touch substrate 620. Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 600 include electrostrictive, magnetostrictive, piezoresistive, acoustic, capacitive, and moving coil transducers/devices, among others.

In one embodiment, all of the sensors 630 are configured to sense vibrations in the touch substrate 620. The sensors 630 may be substantially the same in terms of technology and functionality. For example, all of the sensors 630 may be bending mode sensors produced by a particular manufacturer under the same part number or identification. In other embodiments, the sensors 630 may be substantially the same in terms of technology, but differ in terms of functionality. For example, all of the sensors 630 may be bending mode sensors produced by a particular manufacturer, with some of these sensors implemented to detect bending waves and other sensors implemented to detect plate deflection. In some embodiments, one or more of the sensors 630 may be a sensor other than a bending mode sensor.

In accordance with another embodiment, one or more of the sensors 630 can be used as an emitter device to emit a signal that can be sensed by the other sensors 630 to be used as a reference signal or to create vibrations that can be altered under a touch input, such altered vibrations being sensed by the sensors 630 to determine the position of the touch. An electrodynamic transducer may be used as a suitable emitter device. Moreover, one or more of the sensors 630 can be configured as a dual purpose sense and excitation transducer, for example as disclosed in previously incorporated International Publications WO 2003/005292 and WO 01/48684 as well as co-assigned U.S. patent application Ser. No. 10/750, 502, which is fully incorporated herein by reference into this document.

Many applications that employ touch sensitive devices 600 also use electronic displays to display information through the touch sensitive devices 600. Since displays are typically rectangular, it is typical and convenient to use rectangular touch sensitive devices 600. As such, the touch substrate 620 to which the sensors 630 are affixed is typically rectangular in shape, it being understood that other geometries may be desirable.

According to one configuration, the sensors 630A, 630B, 630C, 630D are preferably placed near the corners of the touch substrate 620. Because many applications call for a display to be viewed through the touch sensitive devices 600, it is desirable to place the sensors 630A-D near the edges of the touch substrate 620 so that they do not undesirably encroach on the viewable display area. Placement of the sensors 630A-D at the corners of a touch substrate 620 can also reduce the influence of acoustic reflections from the panel edges.

The contact sensed by the touch sensitive device 600 may be in the form of a touch from a stylus, which may be in the form of a hand-held pen. The movement of a stylus on the touch substrate 620 may generate a continuous signal, which is affected by the location, pressure and speed of the stylus on the touch substrate 620. The stylus may have a flexible tip, e.g. of rubber, which generates bending waves in the touch substrate 620 by applying a variable force thereto. The variable force may be provided by the tip, which alternatively adheres to or slips across a surface of the touch substrate 620. Alternatively, the contact may be in the form of a touch from a finger that may generate bending waves in the touch substrate 620, which may be detected by passive and/or active sensing. The bending waves may have frequency components in the ultrasonic region (>20 kHz).

The touch sensitive device 600 shown in FIG. 6 is communicatively coupled to a controller 650. The sensors 630A-D are electrically coupled to the controller 650 via wires or a printed electrode pattern developed on the touch substrate 620. The controller 650 typically includes front end electronics that applies signals to the sensors 630 and measures signals or signal changes. In other configurations, the controller 650 may further include a microprocessor in addition to front end electronics. The controller 650, as is described in detail below, is capable of implementing one or more touch location detection techniques selected from a library of disparate touch location detection techniques. Selection of the various touch location detection techniques may be made based on criteria discussed above, and such selection may be modified in response to changes in touch stimuli characteristics, operating conditions, environmental conditions, and the like.

In a typical deployment configuration, the touch sensitive device 600 is used in combination with a display of a host computing system (not shown) to provide for visual and tactile interaction between a user and the host computing system. The host computing system may include a communications interface, such as a network interface, to facilitate communications between a touch panel system that incorporates touch sensitive device 600 and a remote system. Various touch panel system diagnostics, calibration, and maintenance routines, for example, may be implemented by cooperative communication between the touch panel system and the remote system.

Figure 7:
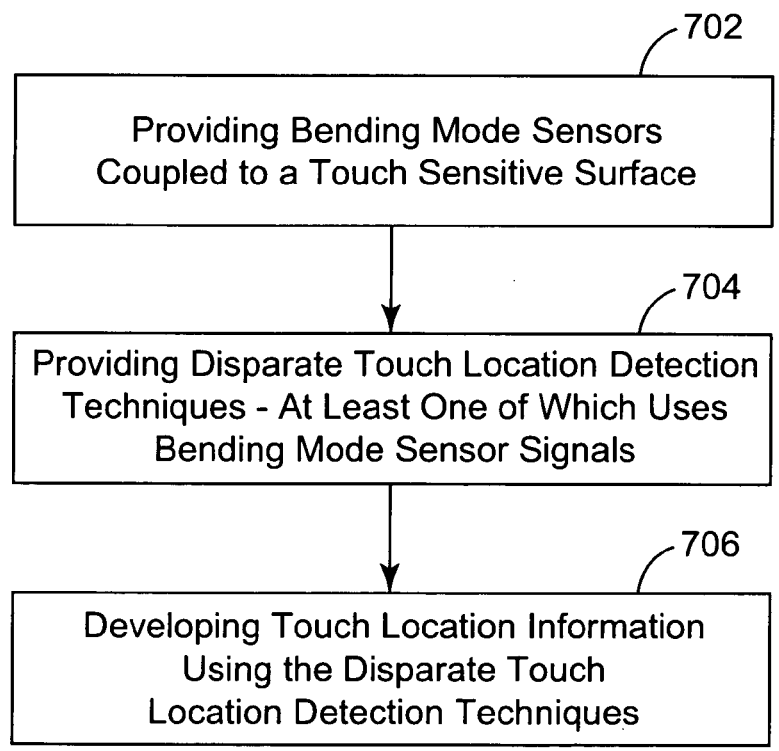
FIG. 7 is a flowchart illustrating a method of developing touch location information using bending mode sensor signals and disparate touch location detection techniques in accordance with embodiments of the invention.

FIG. 7 is a flowchart illustrating a method of developing touch location information using bending mode sensor signals and disparate touch location detection techniques in accordance with embodiments of the invention. The methodology illustrated in FIG. 7 involves providing 702 bending mode sensors that are coupled to a touch sensitive surface. A multiplicity of disparate touch location detection techniques are provided 704. At least one of these techniques uses bending mode sensor signals. Touch location information is developed 706 using the disparate touch location detection techniques.

Developing the touch location may involve determining the location of the touch on the touch sensitive surface. At least some of the disparate touch location detection techniques are capable of independently detecting a touch location. For example, a first touch location detection technique may determine x and y coordinates of a touch location relative to the touch sensitive surface, and a second touch location detection technique may determine a z coordinate relative to the touch sensitive surface.

The touch location information may include information that facilitates calibration of the touch panel system or is useful when performing system diagnostics or maintenance. In some embodiments, at least two differing touch location detection techniques are provided that use signals generated by the bending mode sensors. For example, two or more touch location detection techniques may use signals generated by the bending mode sensors, but differ from one another in terms of frequency response or other characteristic, such as accuracy of the touch location measurement, resolution of the measurement, speed at which the measurement may be acquired, and resources consumed by the touch location process.

By way of further example, two or more touch location detection techniques may differ from one another in terms of the manner by which each processes bending mode sensor signals to produce touch location information. In one embodiment, a particular touch location detection technique may operate on bending wave signals in two or more distinct ways to produce touch location information. In another embodiment, two or more distinct touch location detection techniques may operate on bending wave signals in substantially the same way to produce touch location information.

Figure 8:
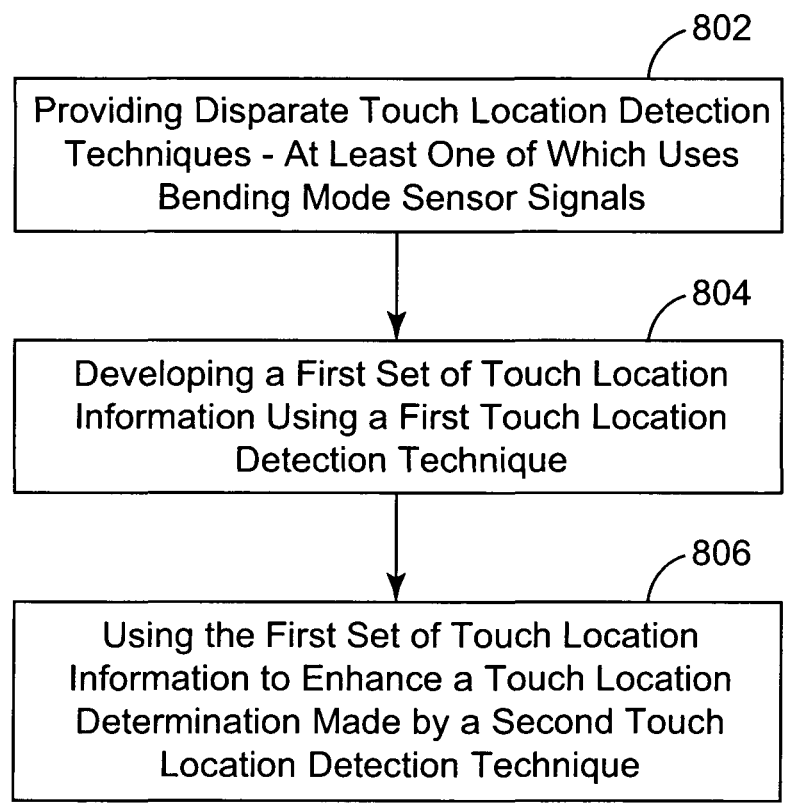
FIG. 8 is a flowchart illustrating a method of enhancing touch location information that involves use of bending mode sensor signals and disparate touch location detection techniques in accordance with embodiments of the invention.

The flowchart of FIG. 8 illustrates a method of enhancing touch location information that involves use of bending mode sensor signals and disparate touch location detection techniques in accordance with embodiments of the invention. The methodology illustrated in FIG. 8 involves providing 802 a multiplicity of disparate touch location detection techniques, at least one of which uses bending mode sensor signals. A first set of touch location information is developed 804 using first touch location detection techniques. The first set of touch location information is used to enhance 806 a touch location determination made by a second touch location detection technique.

Figure 9:
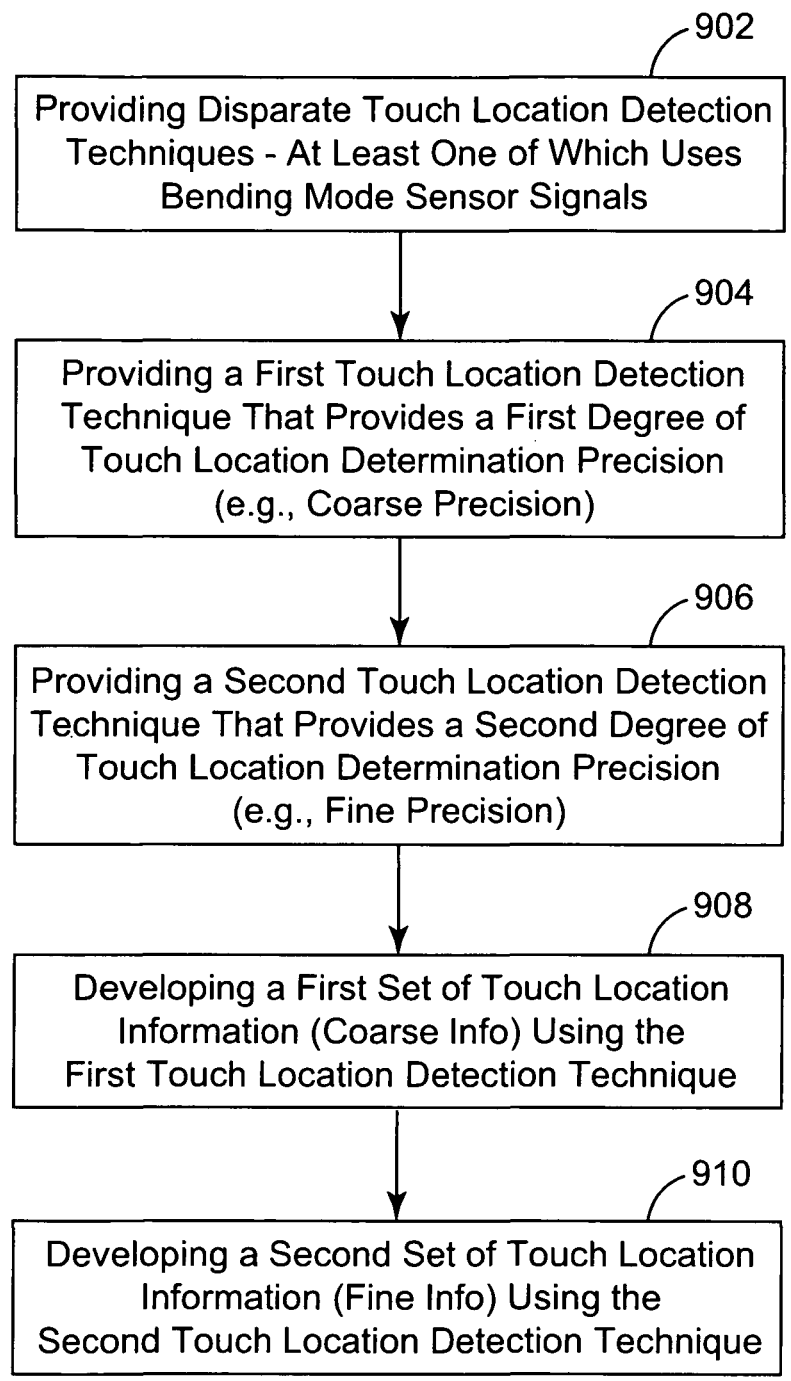
FIG. 9 is a flowchart illustrating another method of developing touch location information using bending mode sensor signals and disparate touch location detection techniques in accordance with embodiments of the invention.

FIG. 9 is a flowchart illustrating another method of developing touch location information using bending mode sensor signals and disparate touch location detection techniques in accordance with embodiments of the invention. The methodology illustrated in FIG. 9 involves providing 902 a multiplicity of disparate touch location detection techniques, at least one of which uses bending mode sensor signals. A first touch location detection technique provides 904 a first degree of precision associated with a touch location determination. A second touch location detection technique may provide 906 a second degree of precision associated with the touch location determination. For example, the first technique may provide for coarse accuracy as to touch location, while the second technique may provide for finer accuracy as to touch location.

A first set of touch location information is developed 908 using the first touch location detection technique. A second set of touch location information is developed 910 using the second touch location detection technique. For example, the first technique may be used to estimate a region of the touch sensitive surface within which the touch occurred. The second technique may be used to provide a more precise estimate of the touch location within the region estimated by the first technique.

Figure 10:
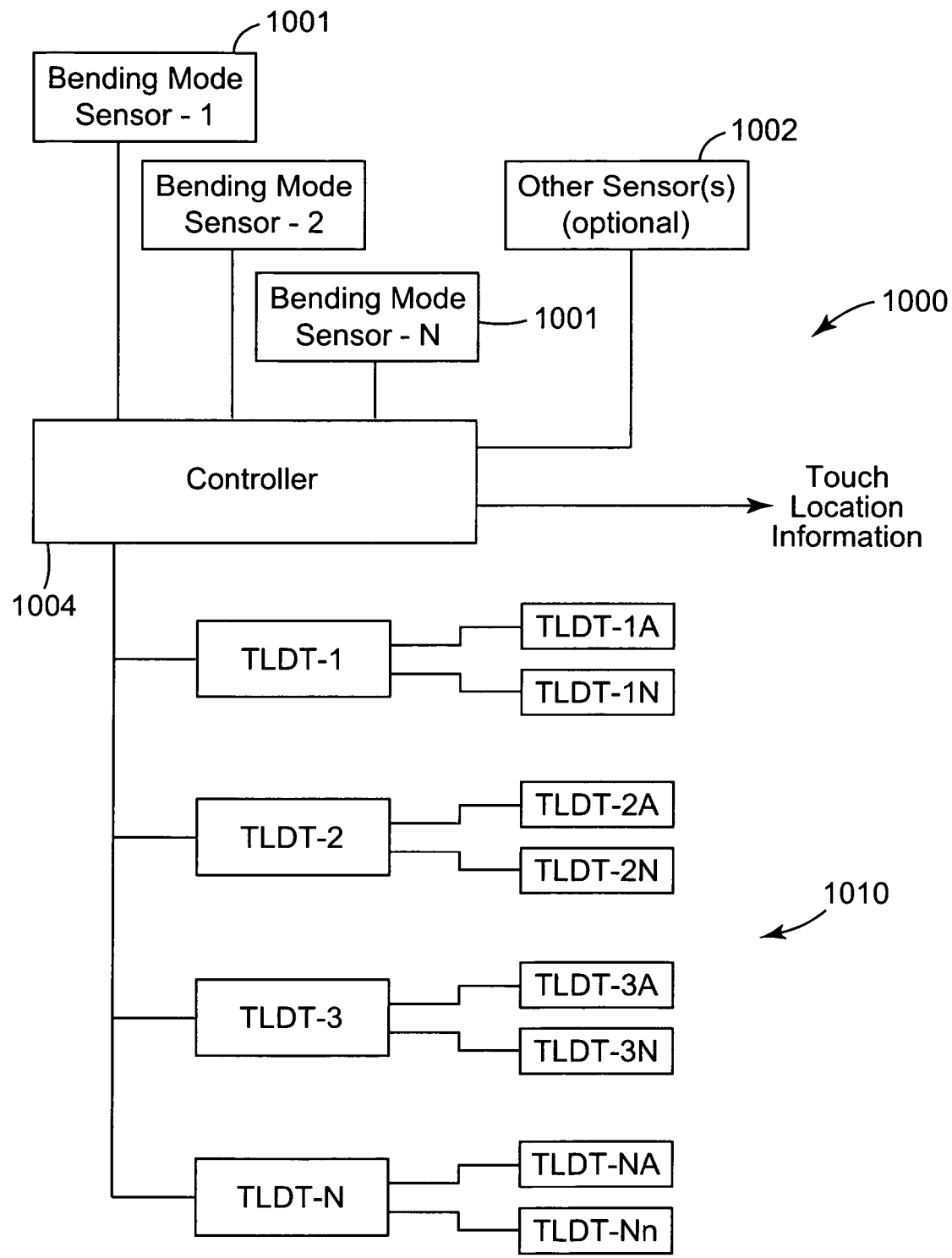
FIGS. 10 and 11 are block diagrams of systems for implementing disparate touch location detection techniques in accordance with embodiments of the invention.

FIG. 10 is a block diagram of a system 1000 for implementing disparate touch location detection techniques in accordance with embodiments of the invention. As is shown in FIG. 10, the system 1000 includes a number of bending mode sensors 1001 and may optionally include other types of sensors 1002 (e.g., capacitive, resistive, force, surface acoustic wave, or optical sensors). The sensors 1001, 1002 are coupled to a touch sensitive surface (not shown) and to a controller 1004. The controller 1004 is configured to implement a number of disparate touch location detection techniques (TLDT) 1010, which may be stored by, or accessed from, memory coupled to the controller 1004. The controller 1004 produces touch location information, such as touch position, using the disparate touch location detection techniques 1010.

For example, technique TLDT-1 differs from each of techniques TLDT-2 through TLDT-N in terms of functionality or other aspect previously discussed above. In this regard, technique TLDT-1 is considered to be a touch location detection technique dissimilar from techniques TLDT-2 through TLDT-N. By way of further example, a given technique, such as technique TLDT-1, may be implemented in several ways so as to provide differing touch location information, notwithstanding that each technique processes bending mode sensor signals in a similar manner. For example, TLDT-1 may represent a touch location detection technique that, in general terms, performs a frequency analysis of bending mode sensor signals. Technique TLDT-1A may, for example, be implemented to analyze frequencies differing from those associated with technique TLDT-1N. Although each of these techniques share a common approach to processing bending mode sensor signals, they do so by analyzing differing characteristics of such signals, and thus produce differing touch location detection information. As such, technique TLDT-1A is considered to be a touch location detection technique dissimilar from technique TLDT-1N.

Figure 11:
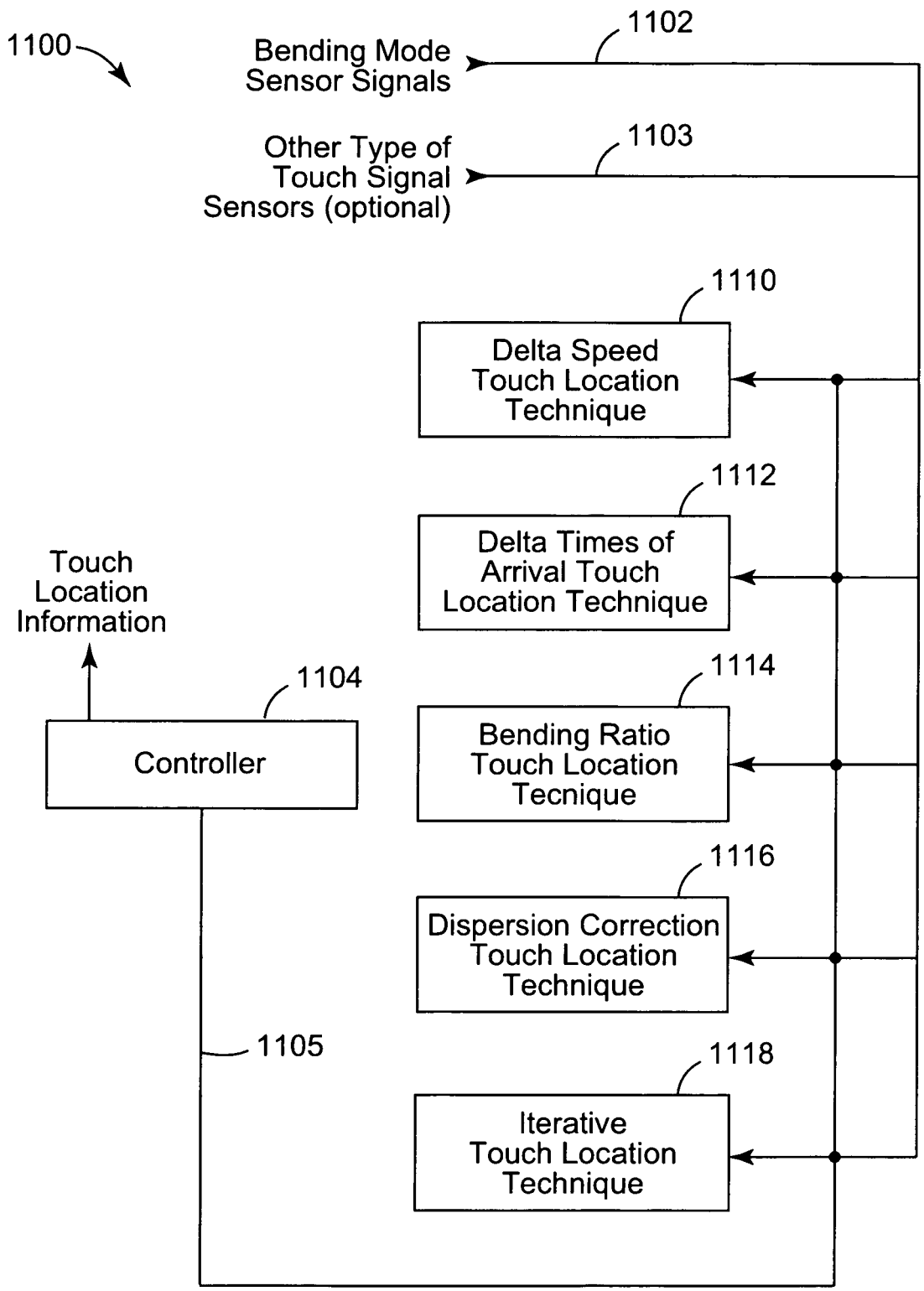

FIG. 11 is a block diagram of a system 1100 for implementing disparate touch location detection techniques in accordance with embodiments of the invention. The system 1100 receives bending mode sensor signals 1102 and may optionally receive other types of touch sensor signals 1103. A controller 1104 is configured to implement a number of disparate touch location detection techniques 1110-1118. The controller 1104 produces touch location information using the disparate touch location detection techniques 1110-1118. In one approach, the controller 1104 generates control signals 1105 that can enable and disable selected ones of the disparate touch location detection techniques 1110-1118. According to this embodiment depicted in FIG. 11, the disparate touch location detection techniques includes a delta speed touch location technique 1110, a delta times of arrival touch location technique 1112, a bending ratio touch location technique 1114, a dispersion correction touch location technique 1116, and an iterative touch location technique 1118. Each of these touch location techniques 1110-1118 will now be described in greater detail.

A delta speed touch location technique 1110 refers to a technique that exploits the phenomena of vibration wave packet dispersion to determine the location of a touch to a touch substrate. A delta speed touch location technique 1110 approach uses vibration wave packet dispersion itself to perform distance measurements from which a touch location may be computed. According to one delta speed touch location technique 1110, a dispersive vibration wave packet caused by a touch to a touch sensitive substrate is sensed at each bending mode sensor. Content of the wave packet containing a specified frequency or frequencies is detected at each sensor. A relative time delay in arrival of wave packet content associated with the specified frequency or frequencies is calculated at each sensor. A distance between each sensor and the touch event is calculated using the relative time delays. The location of the touch may then be determined using the calculated distances.

In this regard, a delta speed touch location technique 1110 may be implemented to measure touch position using only the differences in wave dispersion to calculate time and distance of wave travel. Different frequencies or frequency bands of a vibration wave packet in a dispersive medium can be separated by digital or analog filtering, and the arrival time of each specific frequency or frequency band can be separately determined.

According to another approach, a sensed vibration wave packet resulting from a touch event can be cross-correlated with baseline waveforms that have been generated by touches at various known locations during a calibration process. This cross-correlation process reveals the best match with a particular waveform that emanated from a known location. Since the origin of calibration waveforms is known, the distance of the touch event can be determined based on the best match of separation times of the energy at various frequencies contained. Additional details of this and other delta speed touch location techniques that can be adapted for use with methods and devices of the present invention are described in commonly owned U.S. Ser. No. 11/025,389 and in U.S. Pat. No. 5,635,643, which are incorporated herein by reference.

With continued reference to FIG. 11, a delta times of arrival touch location technique 1112 involves touch location determination based on time of arrival of first energy at each bending mode sensor. For example, the time of arrival at each sensor may be determined when energy at each sensor exceeds a pre-set threshold. The difference in arrival time of above-threshold energy may be used to calculate a location of an initial touch, such as a tap. This technique 1112 is not effective in measuring position of a moving continuous touch, such as a drag. However, a delta times of arrival technique can measure touch with much simpler, and perhaps lower power, processing than other more robust techniques. Such other technique may be used to calculate a finer (more accurate) touch location and/or to calculate position during a drag operation. Useful delta times of arrival techniques are further described in U.S. Pat. No. 5,691,959 and WO 01/48684, which are hereby incorporated herein by reference.

Figure 12:
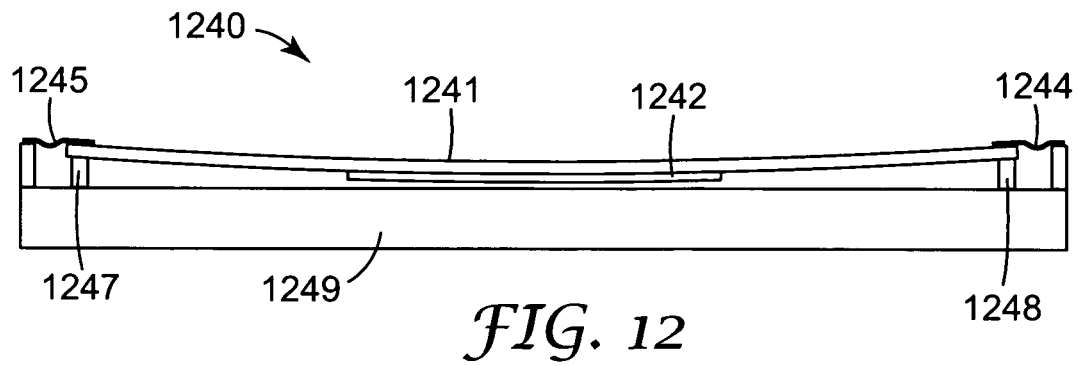
FIG. 12 illustrates a touch system with an overlay and sensors on each edge that measure long-wavelength bending of the overlay in accordance with embodiments of the invention.

A bending ratio touch location technique 1114 shown in FIG. 11 uses plate bending in combination with simple ratio of magnitudes measurements and calculations to measure touch location. FIG. 12 shows a system 1240 with an overlay 1241 and sensors 1242 on each edge that measure long-wavelength bending of overlay 1241. Sensors 1242 may extend along the full length of each edge, or a portion of the edge length. Panel 1241 is attached to foundation 1249 at the corners by supports 1247 and 1248, which constrain panel 1241 vertically. Overlay 1241 is constrained from moving in the lateral direction (e.g., in the plane of overlay 1241) by edges 1244 and 1245, attached to foundation 1249.

The fundamental half-wave frequency of oscillation of a typical glass touch sensor (in the bending mode shown in FIG. 12) is in the range of 50 Hz to 1 K Hz, depending on glass thickness, edge length, and suspension characteristics. Finger touches will have maximum energy at frequencies of 5 Hz to 1 K Hz, so detecting touch by measuring at and near the half-wave bending mode frequency yields good signal levels. Measuring signals in this frequency range will reduce the hysteresis effects and non-linearities in components 1244, 1245, 1247, and 1248 that suspend panel 1241, relative to near-static (0 to 10 Hz) measurements.

With continued reference to FIG. 11, a dispersion correction touch location technique 1116 may be used to develop touch location information using bending mode signals. When the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Exemplary techniques for addressing vibration wave packet dispersion and producing representative signals corrected for such dispersion are disclosed in International Publications WO 2003/005292 and WO 01/48684, and in U.S. Pat. No. 6,871,149, which are incorporated herein by reference.

According to one approach that operates to correct for vibration wave packet dispersion, for example, a first bending mode sensor mounted on a structure capable of supporting bending waves measures a first measured bending wave signal. A second bending mode sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated International Publications WO 2003/005292 and WO 01/48684, and in U.S. Pat. No. 6,871,149.

Figure 13:
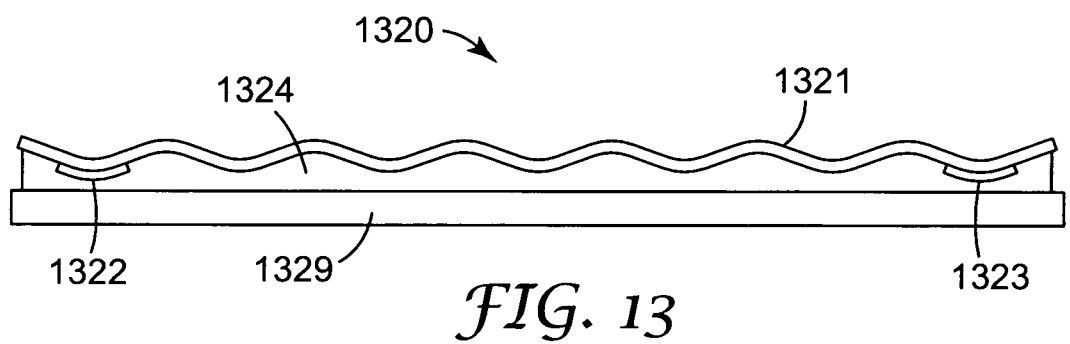
FIG. 13 illustrates a touch system having an overlay with bending mode piezoelectric transducer sensors that measure vibration of the overlay in accordance with embodiments of the invention.

For example, FIG. 13 shows an overlay 1321 with bending mode piezoelectric transducer sensors 1322 and 1323 that measure vibration of the overlay 1321, typically at audio frequencies. Touch position may be calculated from the frequency-corrected time of flight of acoustic waves. Compliant suspension 1324 may also act as a gasket, and may dampen acoustic signals at the edge of overlay 1321. In a further example, a time domain technique, whether or not dispersion correction is employed, may be used to produce initial positional information, and a technique that operates on phase differences may be used to refine the initial positional information produced by the time domain technique.

An iterative touch location technique 1118, also shown in FIG. 11, provides for a number of enhanced capabilities. For example, an approximate touch location acquired using a simple computation can be used to inform a more accurate touch location analysis via an iterative process. The approximate or intermediate touch locations can be used to iteratively adjust the sensor signals such that the accuracy of the simple computation can be increased.

Other touch location methods determine the touch location to an accuracy that is inherent in the touch location technique used. An iterative touch location technique 1118 provides the capability of iterating towards an exact reconstruction of the source waveforms. Thus, use of such an iterative technique allows the touch location to be determined to a desired or required level of accuracy.

By way of example, touch location signals are generated in response to vibrations created by a touch on a touch plate such as by the processes described above. An approximate touch location of the touch is determined. The approximate touch location may be an arbitrarily selected location, may be based on the generated signals, or may be approximated by other methods. In one scenario, a first touch location technique may be used to approximate the touch location and a second touch location technique may be used to more accurately determine the touch location through the iterative process.

The generated signals are adjusted based on the approximate touch location. The touch location is calculated based on the adjusted signals. The iteration may continue by using the newly determined intermediate touch location to again adjust the signals, recalculating the touch location for any number of iterations. The iterative process may be repeated for multiple cycles to achieve a desired or required touch location accuracy. Upon completion of the requisite number of cycles or upon achieving the desired accuracy, the touch location algorithm ends, returning the last touch location determined by the iterative process. Examples of iterative touch location techniques 1118 are described in commonly owned U.S. Ser. No. 11/032,572, previously incorporated herein by reference.

The following examples illustrate use of multiple disparate touch location techniques to generate touch location information in accordance with embodiments of the present invention. According to one approach, low frequency measurements of panel bending and bend ratio analysis (e.g., a bending ratio touch location technique 1114) may be combined with audio frequency dispersion correction measurement and frequency domain analysis (e.g., a dispersion correction touch location technique 1116) to achieve complimentary coarse and fine measurement of touch position.

Figure 14:
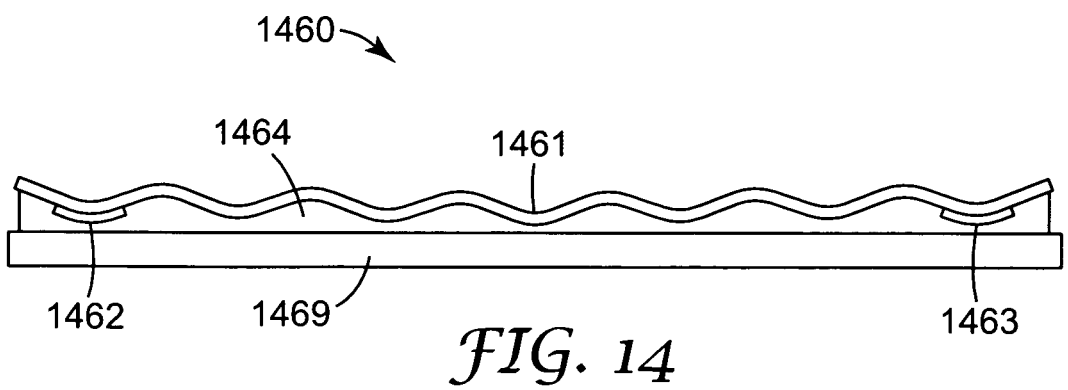
FIG. 14 illustrates a touch system having an overlay and sensors at each corner that may be used to determine touch location in accordance with embodiments of the invention.

FIG. 14, for example, shows system 1460 with overlay 1461 and sensors 1462 and 1463 at each corner. Sensors 1462 and 1463 measure bending of overlay 1461. Sensors 1462 and 1463 are preferably the same sensors that measure audio frequency vibrations when using a dispersion correction touch location technique 1116 in combination with a bending ratio touch location technique 1114. Compliant suspension 1464 is a strip around the periphery of panel 1461. It is preferable that suspension 1464 also serve as a gasket for the touch system, and its damping characteristics must accommodate audio frequency requirements of the particular dispersion correction touch location technique 1116 and the low frequency plate bending requirements of the particular bending ratio touch location technique 1114. The suspension 1464 may contact panel 1461 on the top surface, bottom surface as shown, or on both surfaces.

As was previously discussed, the fundamental half-wave bending mode frequency of oscillation of a typical glass touch sensor is in the range of 50 Hz to 1 K Hz, and finger touches will have maximum energy at frequencies of 5 Hz to 1 K Hz. As such, detecting touch by measuring at and near the half-wave bending mode frequency yields good signal levels. As was also discussed, measuring signals in this low frequency bending mode range (50 Hz to 1 K Hz) will reduce the hysteresis effects and non-linearities in the spring constant of suspension 64, relative to near-static (0 to 10 Hz) measurements. The bending system shown in FIG. 14 is also relatively immune to large-area "noise" forces such as airborne acoustic waves. But, resolution and accuracy may be limited by non-measured (error) forces that are transferred between panel 1461 and foundation 1469 through suspension 1464. These include bending forces due to foundation flexure and suspension 1464 non-uniformities.

Certain touch location detection techniques are better suited for determining coarse location of a touch on a touch sensitive substrate, while others are better suited for determining fine location of the touch on the touch sensitive substrate. The following illustrative methodology involves determining a coarse position of a touch using one of several techniques, and further involves determining a fine position of the touch using one of several other techniques.

Step A—Finding a Coarse Touch Position by One of Several Methods:
1. Measure relative delta times of arrival (e.g., technique 1112) of time-based waveforms. For example, measure the (first) time that energy at each sensor goes above a threshold. The difference in arrival time of above-threshold energy may be used to calculate a coarse position. This coarse approach involves simpler calculations than a dispersion correction touch location technique 1116, for example, and may be implemented in less time, with less processing power.
2. The amount of dispersion of received waves (e.g., delay in receiving 3 KHz energy vs. receiving 15 KHz energy) can be used to calculate time of propagation of waves, since dispersion is proportional to time (e.g., delta speed touch location technique 1110). A coarse position is determined using simple measurements and calculations of this dispersion difference, then a fine position is derived by a method outlined among the "fine position" options below.
3. Static/low frequency plate-bending signals may be used to generate a coarse touch position by methods described above with respect to a bending ratio touch location technique 1116. The panel, panel suspension, and sensors used to measure Lamb wave acoustic signals (e.g., dispersion correction touch location technique 1116) may also be used to measure low frequency plate bending signals. This allows a single set of sensors to measure two types of signals (e.g., bend ratio and dispersion correction which both use bending waves in separate frequency ranges, and with different distance measuring criteria). The different signal types (and their different calculation techniques) may be combined to achieve better results than is possible with either method alone.
4. An iterative touch location technique 1118 may be used to generate a coarse position, as previously discussed. This method uses an iterative approach with multiple, relatively simple calculations in the frequency domain to locate a touch position from (passive) acoustic data in a panel, such as that used for a dispersion correction touch location technique 1116.
   a. Multiple passes of this algorithm can be used to calculate both the coarse and the fine accuracy required to locate a touch, or
   b. One (or more) pass of this algorithm may be used to calculate coarse position from acoustic data, then dispersion correction algorithms may be used to calculate a fine (higher accuracy) position, using the same acoustic data.
   c. Simplified dispersion correction algorithms (lower resolution fast Fourier Transfers or FFTs) may be used on measured acoustic data to calculate a coarse position, then one (or more) pass of this iterative algorithm may be used to calculate a fine position from the same acoustic data.

Step B—Refine to a More Accurate Fine Position by One of Several Methods:
1. A frequency domain based iterative touch location technique 1118 may be used to refine a coarse position derived from time domain techniques 1, 2, or 3 above, or frequency domain based technique 4 above into one with higher accuracy.
2. Touch detection by simpler time based measurements of approximate location (from process 1, 2, or 3 above) may trigger known FFT algorithms (e.g., iterative or dispersion correction) that will calculate a more accurate position. As touch location moves during a drag/write operation, delta times of arrival and delta speed touch location techniques 1112, 1110 may lose accuracy due to lack of signal magnitude, lack of change in signal, and interference from reflections; so algorithms such as dispersion correction 1116 or perhaps iterative 1118 may be used to track the location during drag.
3. Time based correlation—given an approximate touch location:

a. The amount of dispersion (D) at each sensor is calculated, based on approximate position.
b. A template of $T_D(t)$ can be generated for each sensor corresponding to the amount of dispersion.
c. The dispersion template $T_D(t)$ may then be correlated with the received wave.
d. Maximum positive correlation confirms that the dispersion (and thus distance to the touch point) is correct for each corner sensor.
e. Less than maximum correlation shows that further error correction is required.

In some cases, the coarse position yielding touch coordinates accurate to 5% to 20%, may be sufficient, for example an application may start with a menu of four to eight widely spaced buttons on a display, and +/−20% accuracy may be sufficient to discriminate which button is touched. Subsequent touch operations may require additional accuracy, so a second touch location technique may be employed.

By way of further example, a hand rejection (e.g., false touch) methodology may be implemented using disparate touch location detection techniques. In one illustrative example, a dispersion correction technique 1116 (e.g., dispersion-corrected acoustic measurement) and a bending ratio technique 1114 (e.g., static/low frequency plate-bending measurement) may be used in combination to implement a hand rejection methodology.

A touch panel used for writing input may have two touch points; one is the hand resting on the panel, and the other is a stylus tip used for writing. It is advantageous to know the location of the hand while measuring stylus position with dispersion correction methods. The hand generates acoustic energy and it also absorbs and reflects some of the energy generated by the stylus during writing. This is especially true for heavy hand pressure. Stylus movement and location are most efficiently located by measuring higher acoustic frequencies. Hand position may be measured separately as a combination of (generally lower frequency) acoustic signals when the hand is moved, plus very low frequency bend ratio measurements when the hand is resting on the tablet surface.

Compensation for hand-generated signals and for the hand's effect on stylus signals may increase accuracy of stylus position measurements.
1. While writing with the stylus, reflections and acoustic noise from the hand may be ignored or actively subtracted out by (some very complex) calculations.
2. If the hand is detected between the stylus and one corner, iterative or dispersion corrected signals received at that corner may be ignored (all 4 corner signals are generally not required for position calculation) or modified.

A wake on touch or touch confirmation methodology may be implemented using bending mode sensors and a multiplicity of disparate touch location detection techniques. A wake on touch methodology, for example, involves sensing bending wave vibrations imparted to a touch substrate and determining whether such wave vibrations resulted from intended or unintended touches to the touch substrate. Some touches to the touch substrate can also be distinguished from other touches made using different touch implements or different touch forces so that only certain intended touches are detected as wake-on touch signals. Details of various wake-on-touch methodologies are disclosed in U.S. patent application Ser. No. 10/683,342, which is incorporated herein by reference. Details of various methodologies directed to lift-off detection and improved sensitivity to light touches are described in commonly owned co-pending U.S. patent application Ser. No. 10/750,291, incorporated herein by reference.

By way of further example, one low power dissipation technique may be used to wake (power up) the main touch measurement system, and another (higher power technique) may be used to measure touch location. Each of these disparate techniques preferably use bending mode sensors. Time-based technique, such as delta times of arrival 1112, delta speed 1110, and bending ratio 1114 for example, may require less processing power than FFT based methods such as dispersion correction 1116, so a time-based method may be used to wake a touch detection process.

Various methods and systems illustrating the combined use of bending wave processes are described in commonly owned U.S. patent application Ser. No. 11/116,463, and incorporated herein by reference.

In some embodiments, information acquired from a first set of sensors or a first methodology may be used to correct for errors in the information acquired from a second set of sensors or a second methodology. For example, the pressure of a touch on a capacitive touch panel may cause movement of the capacitive sensor relative to its environment, including nearby conductive objects such as the display and/or chassis. The movement of the touch panel causes a change in capacitive current that may cause errors in the measured location of the valid touch. This phenomenon is especially prevalent for larger touch panels, e.g., greater than about 20 inches diagonal, because large panels have greater parasitic capacitance and bend more than small ones. The combination of greater parasitic capacitance and increased bending causes larger changes in parasitic capacitance with touch pressure for large touch panels. A grounded or driven rear shield helps to reduce the parasitic capacitance and capacitive changes associated with touch panel movement.

Many capacitive touch screens use a transparent rear shield that provides several beneficial effects. A grounded or driven rear shield blocks changes in parasitic capacitive coupling to the nearby display or chassis when the touch screen moves under touch pressure. A driven shield minimizes capacitive coupling of the touch surface to a nearby display or chassis. In addition, the rear shield blocks electromagnetic interference (EMI) coming from behind the touch panel, such as EMI emanating from a display device.

Despite the benefits of the rear shield, the additional shield layer increases the cost of the touch panel and reduces the optical transmission through transparent touch panels. Embodiments of the invention involve a capacitive touch panel without a rear shield. The capacitive touch system of the present invention provides some of the benefits of a rear shield listed above without the associated consequences of expense and loss of optical transmission.

Figure 15A:
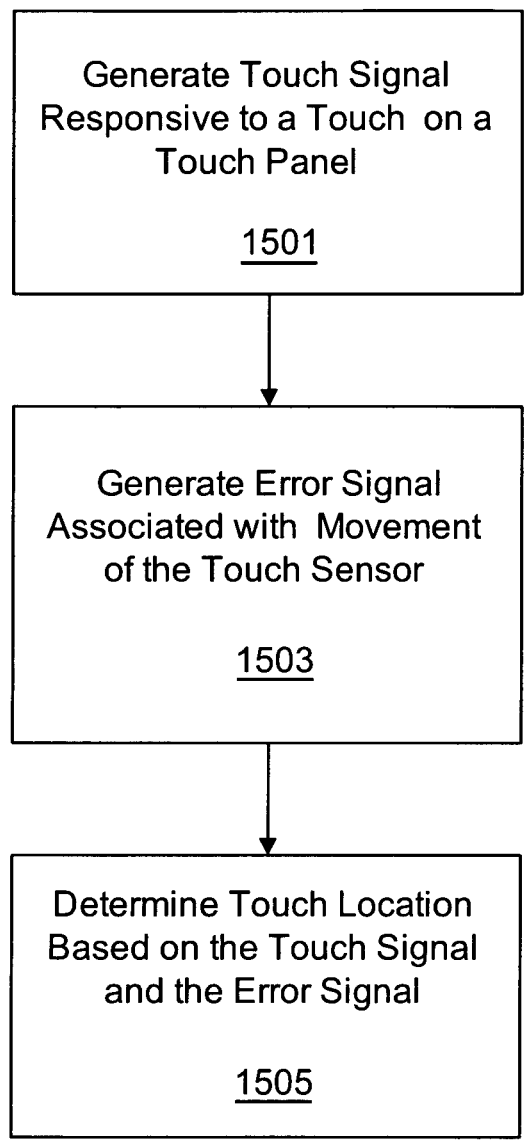
FIGS. 15A and 15B are a flowcharts illustrating touch sensing methods involving error correction in accordance with embodiments of the invention.

Embodiments of the invention are directed to methods and systems for error correction and EMI shielding in touch panel systems that do not use a rear shield. An additional sensor or sensors are employed to correct for errors in touch location determination caused by changes in parasitic capacitance due to touch panel movement. FIG. 15A is a flowchart illustrating a touch sensing method in accordance with embodiments of the invention. According to this method, touch signals indicative of a capacitively coupled touch on a touch panel are generated 1501. An error signal associated with an error in the touch signal is generated 1503. The error signal is related to the movement of the capacitive touch panel due to the touch pressure. Movement of the touch panel may include, for example, displacement of the touch panel, bending, flexing and/or torsion of the touch panel and/or any other change in the physical orientation of the touch panel with respect to one or more nearby structures. The touch location is determined 1505 based on the touch signals and the error signal.

In one implementation, the error signal may be generated based on a change in current due to a changing capacitance caused by movement of the touch panel. As described herein, such an error signal may be generated using rear electrodes disposed on a capacitive touch panel. In other configurations, the error signal may be generated by a force sensor, accelerometer, bending mode sensor or any other type of sensor configured to sense a parameter indicative of touch panel movement. In some embodiments, the error signal may be used to measure the force of the touch on the touch panel surface.

Figure 15B:
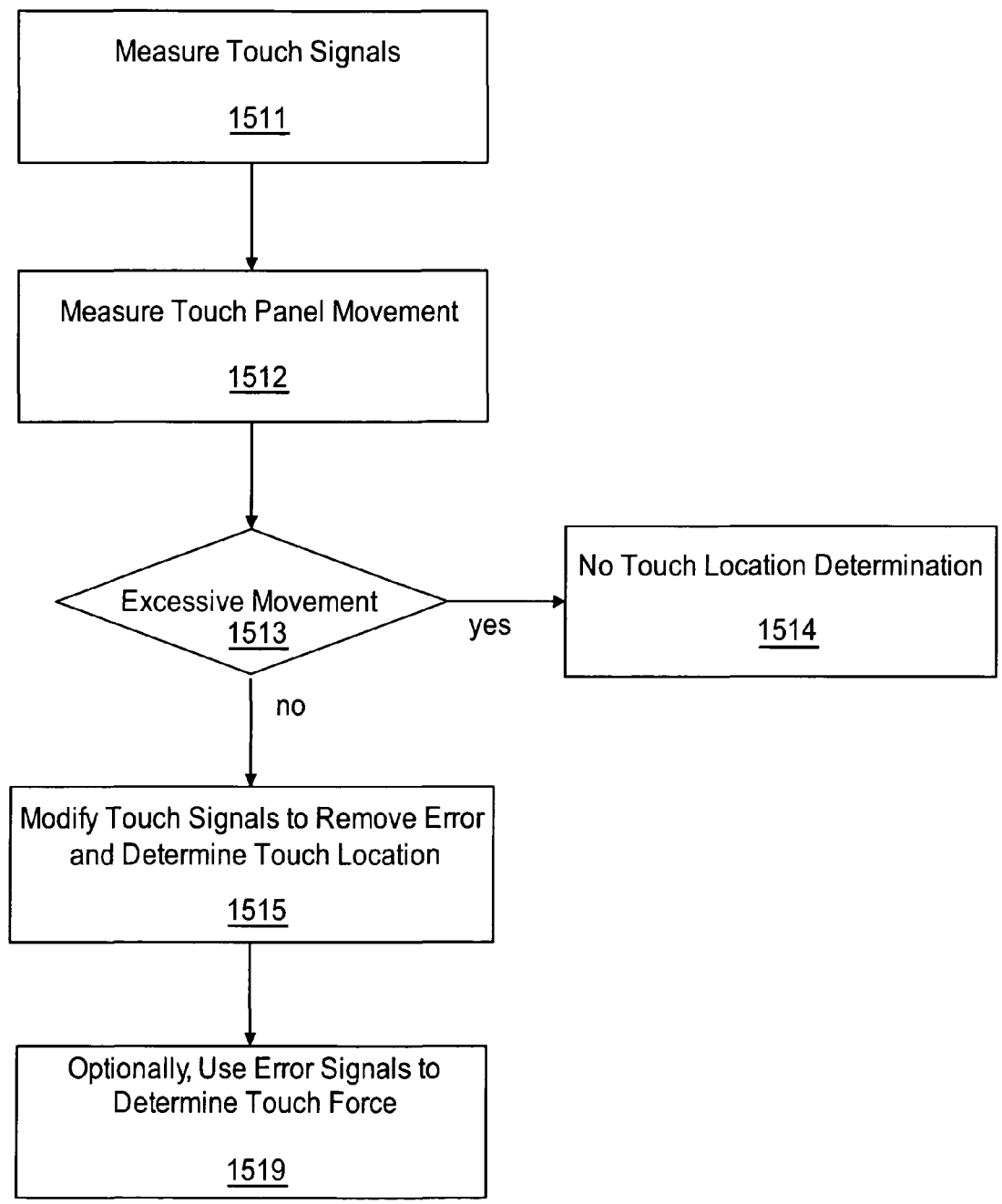

FIG. 15B is a flowchart illustrating a method for enhancing touch location determination in accordance with embodiments of the invention. Touch signals are measured 1511 at one or more electrodes of a touch panel, for example, electrodes positioned at each of the corners of a rectangular touch panel. Movement of the touch panel due to touch pressure may cause touch signal measurement errors. In some implementations, movement of the touch panel may be measured 1512 separately from touch signals, and the known amount of movement can be used to estimate the touch signal measurement errors. Estimated errors can then be used to modify 1515 touch signals to remove the errors, or to avoid 1514 making measurements when sensor movement errors are too large 1513. In other implementations, signals generated by the error sensors may be used correct for errors caused by movement of the touch panel without measuring the amount of movement. Optionally, the error signals may also be used to determine 1519 the Z-axis force of the touch on the touch panel.

Figure 16:
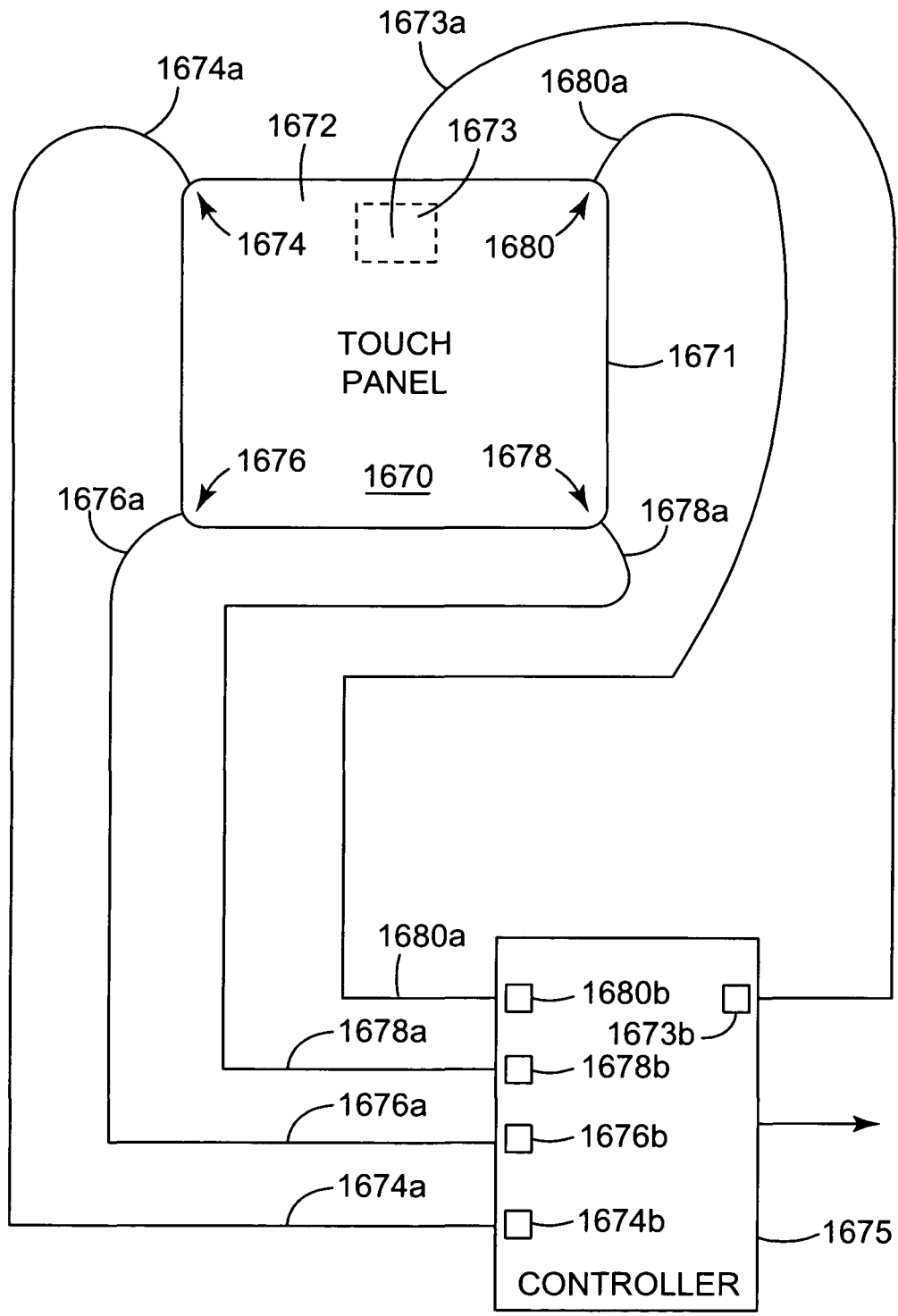
FIG. 16 illustrates a touch screen system that includes a capacitive touch panel electrically coupled to a controller in accordance with an embodiment of the present invention.

In FIG. 16, there is shown a touch screen system that includes a capacitive touch panel 1670 electrically coupled to a controller 1675 in accordance with an embodiment of the present invention. The capacitive touch panel 1670 illustrated in FIG. 16 may be used in connection with touch location detection with error correction in accordance with embodiments of the invention. The touch panel 1670 includes a substrate, such as glass, which has top and rear surfaces 1672, 1671 respectively provided with an electrically conductive coating. The top surface 1672 is the primary surface for sensing touch. The top surface 1672 is nominally driven with an AC voltage in the range of about 1 V to about 5 V.

The touch panel 1670 is shown to include four corner terminals 1674, 1676, 1678, 1680 to which respective wires 1674a, 1676a, 1678a, 1680a are attached. Each of the wires 1674a, 1676a, 1678a, 1680a is coupled to the controller 1675. The wires 1674a, 1676a, 1678a, 1680a connect their respective corner terminals 1674, 1676, 1678, 1680 to respective drive/sense circuits 1674b, 1676b, 1678b, 1680b provided in the controller 1675.

The touch screen system also includes at least one wire 1673a coupled at least one error sensor 1673. In one embodiment, the error sensor 1673 comprises a capacitive sensor that generates a signal based on a change in capacitance caused by movement of the touch surface due to touch pressure. The error sensor 1673 is coupled by the wire 1673a to an error sensor drive/sense circuit 1673b in controller 1675.

The controller 1675 controls the voltage at each of the corner terminals 1674, 1676, 1678, 1680 via drive/sense circuits 1674b, 1676b, 1678b, 1680b to maintain a desired voltage on the top surface 1672. A finger or stylus touch force applied to the top surface 1672 is detected as an effective small capacitor applied to the top surface 1672. The touch produces a change in current flow measurements made by the controller 1675 via corner drive/sense circuits 1674b, 1676b, 1678b, 1680b. The controller 1675 measures the changes in currents at each corner terminal 1674, 1676, 1678, 1680 caused by the change in capacitance and determines the touch location based on the relative magnitudes of the corner currents, typically using Equations 5 and 6 below.

$$XT=(UR+LR-UL-LL)/(UR+LR+UL+LL) \qquad \text{Equation 5}$$

$$YT=(UR+UL-LR-LL)/(UR+LR+UL+LL) \qquad \text{Equation 6}$$

where UL, LL, LR, UR are currents measured at the upper left, lower left, lower right, upper right corner terminals 1674, 1676, 1678, 1680, respectively.

The error sensor 1673 generates an error signal based on the movement of the touch sensor 1670 with respect to surrounding conductive structures due to the touch pressure. The controller 1675 determines the touch location based on the change in current flow measurements made by the controller 1675 via corner drive/sense circuits 1674b, 1676b, 1678b, 1680b and the change in the error signal measurement made by the controller via the error drive/sense circuit 1673b.

Figure 17:
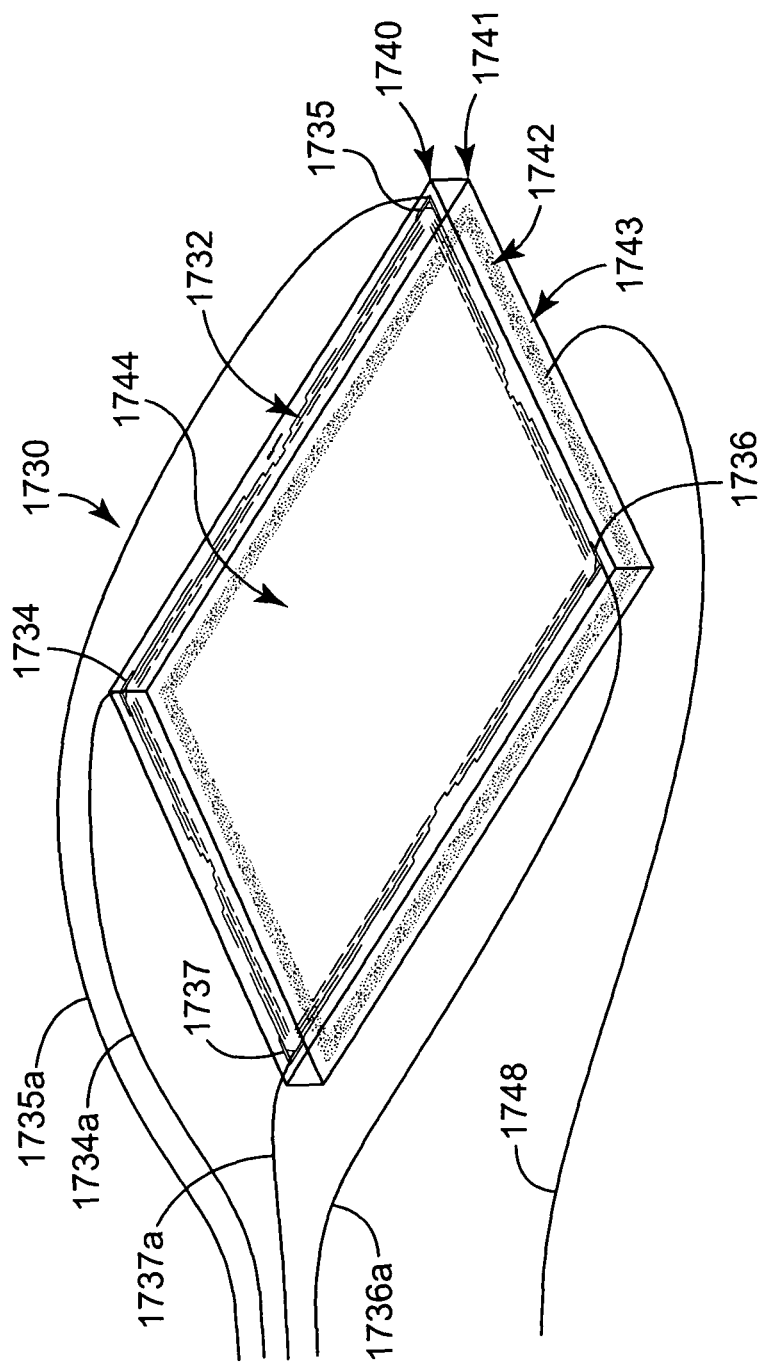
FIGS. 17 and 18 illustrate capacitive touch panels having rear electrodes used for error correction in accordance with embodiments of the invention.
Figure 18:
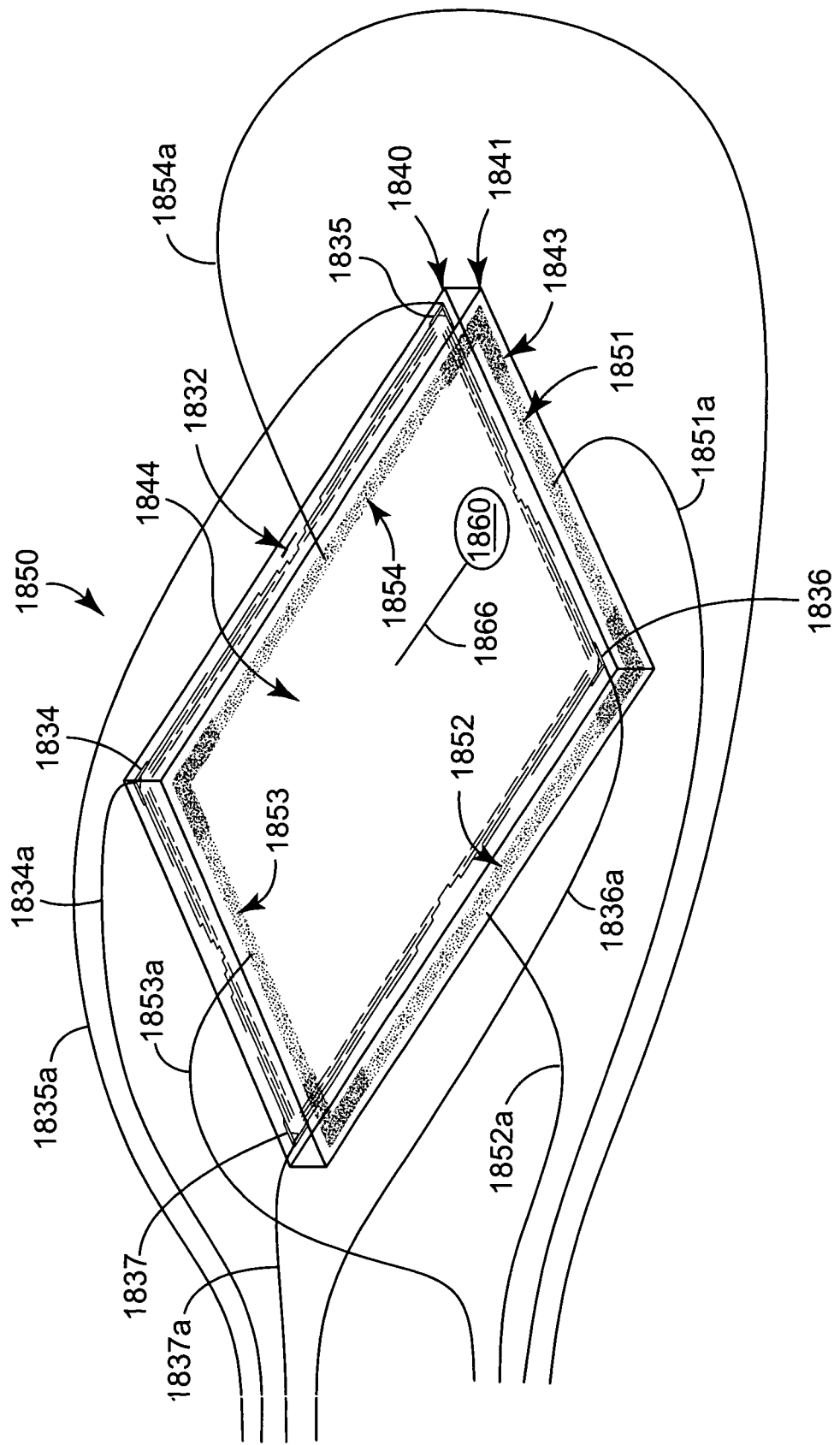

FIGS. 17 and 18 illustrate capacitive touch panels having rear electrodes used for error correction in accordance with embodiments of the invention. FIGS. 17 and 18 are examples of capacitive touch panels 1730, 1850 that do not include a transparent rear shield layer. The touch panels may include, for example, a single rear electrode 1742 as depicted in FIG. 17, or multiple rear electrodes 1851, 1852, 1853, 1854, as depicted in FIG. 18. The rear electrodes 1742, 1851, 1852, 1853, 1854 serve various purposes. For example, if connected to a low impedance, rear electrodes 1742, 1851, 1852, 1853, 1854 shield a portion of the touch panel 1730, 1850 from electromagnetic interference (EMI).

If driven with the same AC signal as the top resistive layer 1744, 1844 of the touch panel 1730, 1850, the rear electrodes 1742, 1851, 1852, 1853, 1854, reduce capacitive coupling to conductive elements behind the touch panel 1730, 1850, typically including the display and/or chassis. If the rear electrodes 1742, 1851, 1852, 1853, 1854 are driven with an equal or larger in-phase AC signal than the top resistive layer 1744, 1844 of the touch panel 1730, 1850, the net parasitic capacitive current through the touch panel 1730, 1850 can be offset to near zero level. This is most useful for large touch panels with high levels of parasitic capacitance that can reduce measurement sensitivity and/or exceed the drive capacity of amplifiers attached to the corners of the touch panels 1730, 1850. If driven with an AC signal, current flow to and from the rear electrode(s) 1742, 1851, 1852, 1853, 1854 can be used to measure movement between the rear electrode(s) 1742, 1851, 1852, 1853, 1854 of the touch panel 1730, 1850 and the conductive elements behind the touch panel 1730, 1850, such as the chassis or display. Additionally, the movement of the rear electrode(s) 1742, 1851, 1852, 1853, 1854 may be used to measure the force applied to the touch panel 1730, 1850.

In FIG. 17, there is shown a capacitive touch panel in accordance with an embodiment of the present invention. According to this configuration, the touch panel 1730 includes a linearization electrode pattern 1732 connected to a top resistive layer 1744 that is provided on a top surface 1740 of the touch panel 1730. The linearization electrode pattern 1732 is configured to have a generally rectangular shape with four corner terminals 1734, 1735, 1736, 1737 respectively connected to a controller (not shown) via wires 1734a, 1735a, 1736a, 1737a. In normal operation, drive signals are applied to the corner terminals 1734, 1735, 1736, 1737 via respective drive circuits in the controller, and the controller measures currents flowing through the corner terminals 1734, 1735, 1736, 1737 via respective sense circuits in the controller. The currents flowing through the corner terminals 1734, 1735, 1736, 1737 are altered if the surface of the touch panel 1744 is touched.

The corner terminals 1734, 1735, 1736, 1737 are typically driven with an AC voltage, and the linearization electrodes 1732 distribute the voltage evenly across the top conductive layer 1744. The touch panel 1730 includes a single rear electrode 1742 which, in this example, is configured as a band of conductive material disposed on a peripheral portion 1743 of the rear surface 1741 of the touch panel 1730. In this configuration, the rear electrode 1742 can be used as a partial shield below the linearization electrode pattern 1732, which is a highly sensitive area of the touch screen sensor 1730. The rear electrode 1742 may be driven via wire 1748 with an AC voltage equal to and in phase with the voltage driving corner terminals 1734, 1735, 1736, 1737. As such, the rear electrode 1742 provides shielding against noise and also minimizes parasitic capacitance effects because negligible capacitive current flows from top resistive layer 1744 to rear electrode 1742.

Further, the rear electrode 1742 may be used to measure movement of the touch panel 1730 relative to nearby conductive structures. If the touch panel 1730 flexes when touched, the capacitance between the rear electrode 1742 and the display surface, chassis, or other supporting structure changes. The change in the signal at the rear electrode 1742 is related to the amount of movement of the touch panel caused by touch force. The error signal at the rear electrode 1742 may be used to correct for errors in the touch signals generated at the corner terminals 1734, 1735, 1736, 1737. The change in the signal at the rear electrode may also be used to measure touch force. The touch force measurement depends on the size of the touch panel 1730 and the mounting method.

With reference to FIG. 17, changes in the current in electrode 1742 will be proportional to changes in capacitance between electrode 1742 and the conductive surface behind the touch panel 1730, such as a display (not shown). The change in capacitance is proportional to the relative movement of the touch panel 1730 with respect to the display. The relative movement of the touch panel 1730 is in turn proportional to the force on the touch panel 1730, provided the touch panel 1730 is movably mounted in proximity to a conductive surface.

Measured touch location errors may be reduced by modifying the measurements at corner terminals 1734, 1735, 1736, 1737 with the signal at rear electrode 1742. For example, in one implementation, the change at rear electrode 1742 may be subtracted equally from the signals at corner terminals 1734, 1735, 1736, 1737. In another implementation, the touch measurements may be discontinued during significant changes in the rear electrode 1742 current to avoid errors in the signals caused by heavy touch pressure.

FIG. 18 illustrates another embodiment of a touch panel well suited for implementing the touch location processes of the present invention. FIG. 18 illustrates a capacitive touch panel 1850 that does not include a rear shield. According to this embodiment, the touch panel 1850 includes a linearization electrode pattern 1832 connected to a top conductive layer 1844 which is disposed on a top surface 1840 of the touch panel 1850. The linearization electrode 1832 includes four corner terminals 1834, 1835, 1836, 1837 respectively connected to a controller (not shown) via wires 1834a, 1835a, 1836a, 1837a.

The rear electrode arrangement in the embodiment of FIG. 18 includes a number of discrete rear electrodes 1851, 1852, 1853, 1854 situated on the rear surface 1841 of the touch panel 1850. In the particular configuration shown in FIG. 18, four rear electrodes 1851, 1852, 1853, 1854 are located about the perimeter 1843 of the rear surface 1841, with each of the rear electrodes 1851, 1852, 1853, 1854 situated along one of the edge regions of the rear surface 1841 of the touch panel 1850. It is understood that the number and location of the rear electrodes 1851, 1852, 1853, 1854 can vary depending on a particular design.

In a configuration in which multiple rear electrodes are employed, as is the embodiment shown in FIG. 18, the controller (not shown) may drive the rear electrodes 1851, 1852, 1853, 1854 with an AC voltage equal to that applied at corner terminals 1834, 1835, 1836, 1837. When controlled in this manner, the multiple rear electrodes 1851, 1852, 1853, 1854 effectively perform the same function as the single rear electrode 1742 in the embodiment depicted in FIG. 17.

The multiple rear electrodes 1851, 1852, 1853, 1854 are coupled to the controller via wires 1851a, 1852a, 1853a, 1854a. In addition to providing shielding for the touch panel 1850, the rear electrodes 1851, 1852, 1853, 1854 may be used to detect and measure movement of the touch panel 1850 relative to nearby conductive structures. If the touch panel 1850 flexes or moves when touched, the capacitance between the rear electrodes 1851, 1852, 1853, 1854 and the display surface, chassis, or other supporting structure changes. The change in the signal at the rear electrodes 1851, 1852, 1853, 1854 is related to the amount of movement of the touch panel 1850 relative to its supporting structures. The signals at the rear electrodes 1851, 1852, 1853, 1854 may be used to calculate the position of an applied force, and it may be used to correct errors in the touch signals generated at the corner terminals 1834, 1835, 1836, 1837. Equations 7 and 8 may be used to calculate the position, XD, YD, of an applied force that generates displacement of panel 1850, where $\Delta T$, $\Delta B$, $\Delta L$ and $\Delta R$ are changes in signals in rear electrodes at the Top, Bottom, Left, and Right edges respectively of touch panel 1850. Equation 9 may be used to calculate a change in total force applied to panel 1950.

$$XD = (\Delta R - \Delta L)/(\Delta R + \Delta L) \qquad \text{Equation 7}$$

$$YD = (\Delta T - \Delta B)/(\Delta T + \Delta B) \qquad \text{Equation 8}$$

$$Z = \Delta T + \Delta B + \Delta L + \Delta R \qquad \text{Equation 9}$$

In one embodiment, touch location may be measured while displacement Z is less than a threshold amount, and subsequent changes in measured touch location may be ignored when touch force Z exceeds a preset threshold.

In another embodiment, a change in XT, YT accompanied by a proportional increase in Z may be interpreted as an error in XT, YT due to bending of panel 1850. In response, the change in XT, YT may not be reported, or if the relationship between Z, XD, YD; and XT, YT changes are pre-measured and stored, then changes in Z, XD, YD may be translated into XT, YT error correction values that are then used to modify XT, YT to reduce errors. Alternatively, the relationship between Z, XD, YD and XT, YT errors may be calculated based on parameters of panel 1850. Parameters include size and stiffness of panel 1850, width of electrodes 1851, 1852, 1853, 1854, proximity of sensor 1850 to grounded supporting members, and stiffness of the mounting system that attaches panel 1850 to its supporting member(s).

In another embodiment, the touch position coordinates XT, YT calculated from measurements at corners 1834, 1835, 1836, 1837 (using Equations 5 and 6) may be modified by a second set of displacement-based coordinates XD, YD calculated with Equations 7 and 8. For example, given Z>a threshold value, measured changes in XT and YT are reported only if equal and simultaneous changes XD and YD are also measured. A change in XT, YT without a corresponding change in XD, YD is indicative of an error due to bending of panel 1850.

In some embodiments, a calibration procedure may be used to help correlate the amount of movement to the magnitude of the error. For example, the calibration procedure may involve calculating the touch location at one or more calibration points using a varying amount of force to vary the bending and displacement of the touch panel. An exemplary calibration procedure may involve the following processes:

1. Touch very lightly, with Z~0 at a point on the panel with known coordinates.
2. Measure corner currents and calculate touch location XT, YT and also XD, YD, and Z.
3. Gradually increase force at the touched point, thus increasing displacement and bending of the touch panel and determine the trend of XT, YT vs. XD, YD, Z for the point under test.
4. Store errors (ΔXT & ΔYT) vs. XD, YD, Z.
5. Subsequently, during normal operation, subtract known (ΔXT and ΔYT) errors caused by significant XD, YD, Z changes.

The calibration procedure may be performed at any number of calibration points on the touch panel. During normal operation, errors at touch locations between the calibration points may be interpolated. The amount of movement or flexing of a touch panel may be a function of the touch panel size and materials. Prior to installation, a universal calibration process may be performed for all similar touch panels. It may be beneficial to perform an additional calibration (or the initial calibration) after installation of the touch panel. Calibration of the touch panel after installation may account for the specific configuration, environmental factors, integration process of the touch panel installation, and/or other installation-related factors that can affect touch location accuracy.

Figure 19A:
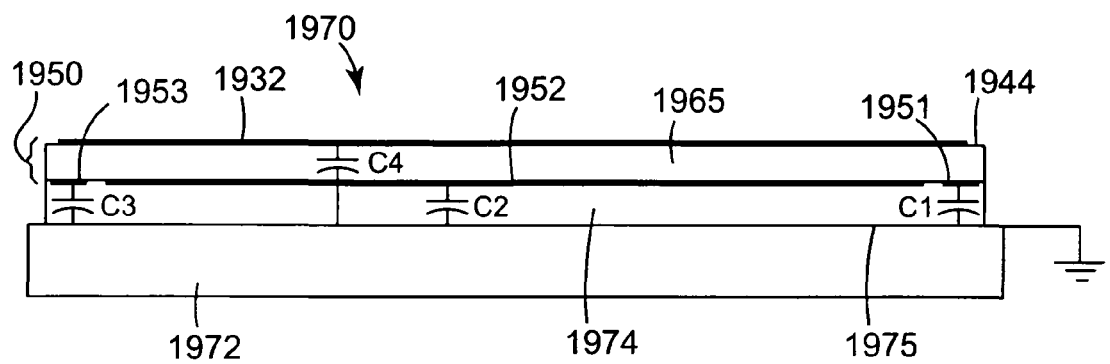
FIGS. 19A-19F illustrate various types of capacitive touch panels that may utilize error correction processes in accordance with embodiments of the invention.
Figure 19B:
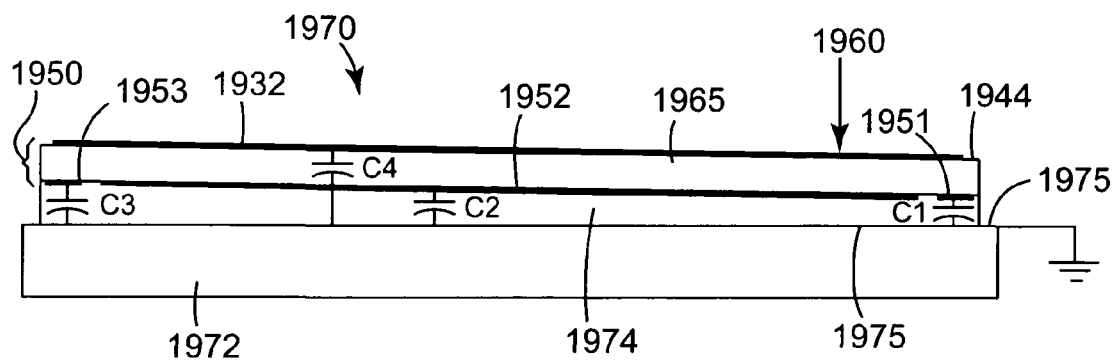

FIGS. 19A and 19B are diagrams illustrating cross sections of a touch system 1970 employing a capacitive touch panel 1950, compliant foam spacer 1974, and display 1972 in accordance with embodiments of the invention. The capacitive touch panel 1950 includes a capacitive substrate 1965 and a conductive layer 1932. The conductive top surface 1975 of the display 1972 is connected to ground through a low impedance. Electrodes 1951, 1953, and 1952 are equidistant from the top surface 1975 of the display 1972.

FIG. 19B illustrates the same system 1970 after a touch force 1960 is applied sufficient to cause the compliant foam 1974 to compress on the right side of the touch system 1970. The force of the touch and resultant compression of the foam 1974 causes the electrode 1951 to move closer to the conductive surface 1975 than electrode 1953. Given equal AC signals at the electrodes 1951 and 1953, the currents flowing to electrodes 1951 and 1953 are equal in FIG. 19A. However, for the system 1970 as in FIG. 19B, the current in electrode 1951 is greater than the current in electrode 1953 by an amount proportional to the relative displacement of electrodes 1951 and 1953 resulting from the applied force 1960. Force may be calculated from displacement, given the known displacement/force properties of compliant foam 1974 and bending properties of panel 1950. Thus the amount and approximate location of a touch force may be measured.

The capacitances between the touch panel 1950 and the display 1972 are represented by capacitors C1, C2, C3, C4. Capacitors C1, C2, and C3 represent the capacitance between electrodes 1951, 1952, 1953 and the display surface 1975. Capacitance C4 represents the capacitance between display surface 1975 and the combination of the conductive surface 1944 and layer 1932. The touch location is determined by a change in capacitance between touch panel surface 1944 and a touching finger (not shown). This change in capacitance may be measured as changes in current at corner electrodes. But, changes in capacitance C4 will also cause changes in capacitance measured at corner electrodes of surface 1944, resulting in errors. Capacitive touch position errors can be reduced by modifying touch position measured via corner electrodes and Equations 5 and 6 with the displacement measured via electrodes 1951-1953 and Equations 7 and 8. For example, error correction may be accomplished by comparing the XT, YT coordinates with the XD, YD coordinates. If a change in XT and YT is the same as a change in XD and YD within a preset limit, then a new XT and YT are calculated and communicated to a host computer. If the XT, YT and XD, YD coordinates do not agree within a limit, new XT, YT coordinates are not calculated.

Figure 19C:
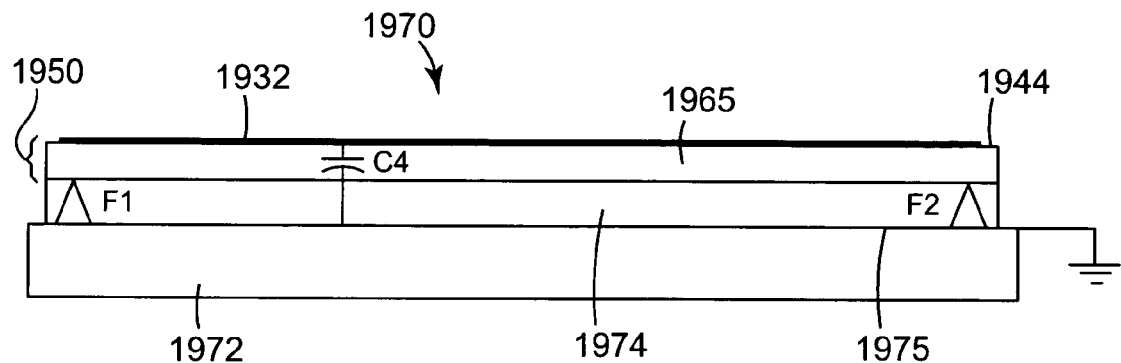
Figure 19D:
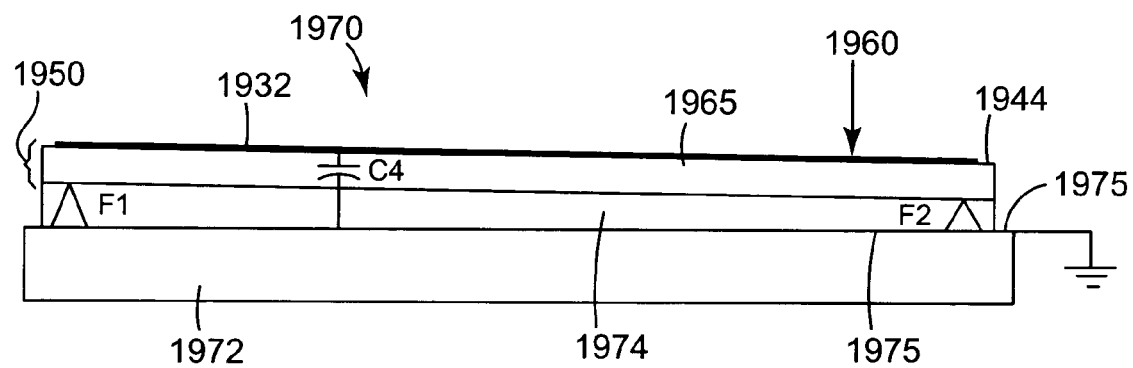

FIGS. 19C and 19D illustrate another configuration in accordance with an embodiment of the invention. In FIGS. 19C and 19D, the rear electrodes 1951, 1952, 1953 of FIGS. 19A and 19B have been replaced by force/displacement sensors F1 and F2. The force/displacement sensors may be any type of force/displacement sensors, including, for example, piezoelectric sensors, strain gauge sensors, capacitive force sensors, or other sensor types. Force/displacement sensors may measure force/displacement between the rear surface of capacitive substrate 1965 and display 1972 as shown in FIGS. 19C and 19D, or they may measure force/displacement between the front surface of panel 1965 and a front-mounted bezel (not shown). Measurement of force/displacement may be made between front-mounted bezel (not shown) and a front mounted shield described in commonly owned U.S. Pat. No. 5,457,289 which is incorporated herein by reference. FIGS. 19C and 19D illustrate the touch system before and after an applied touch 1960, respectively. In FIG. 19C, the force on the force sensors F1 and F2 is approximately equal. In FIG. 19D, the force at sensor F2 is greater than the force at sensor F1 due to the applied touch 1960, causing greater force and/or displacement at sensor F2 than at sensor F1. In this embodiment, error correction may be accomplished by measuring the touch signals, measuring the panel displacement or force using the force/displacement sensors and adjusting the touch position calculation of XT, YT to compensate for capacitance changes caused by displacement of panel 1950.

In other embodiments, the touch panel may incorporate bending mode touch sensors. Bending mode sensors may measure bending between the rear surface of panel 1965 and substrate 1972 as shown in FIGS. 19C and 19D, or they may measure bending between the front surface of panel 1965 and a front-mounted bezel (not shown). The signals generated by the bending mode sensors may be used to correct for parasitic capacitance changes due to touch pressure. Bending mode and/or other sensing methodologies may also be optionally used to provide Z-axis touch force measurement.

Figure 19E:
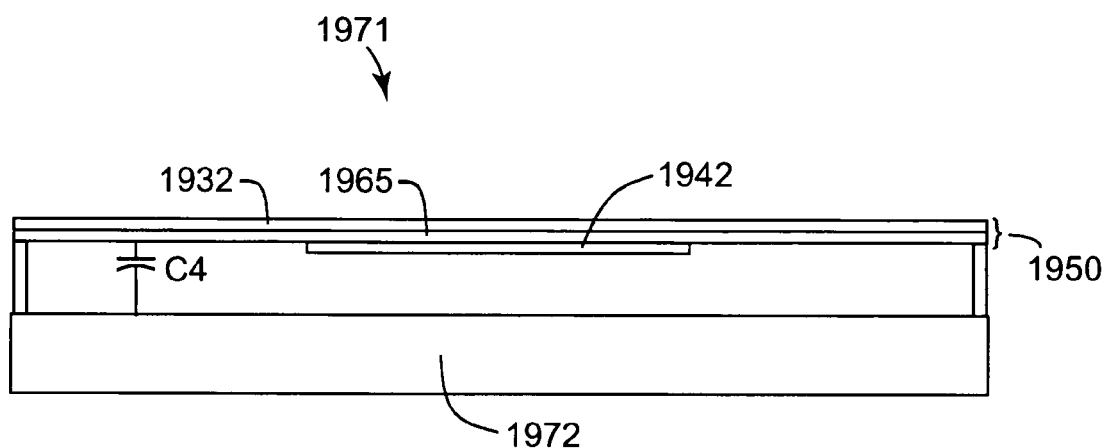
Figure 19F:
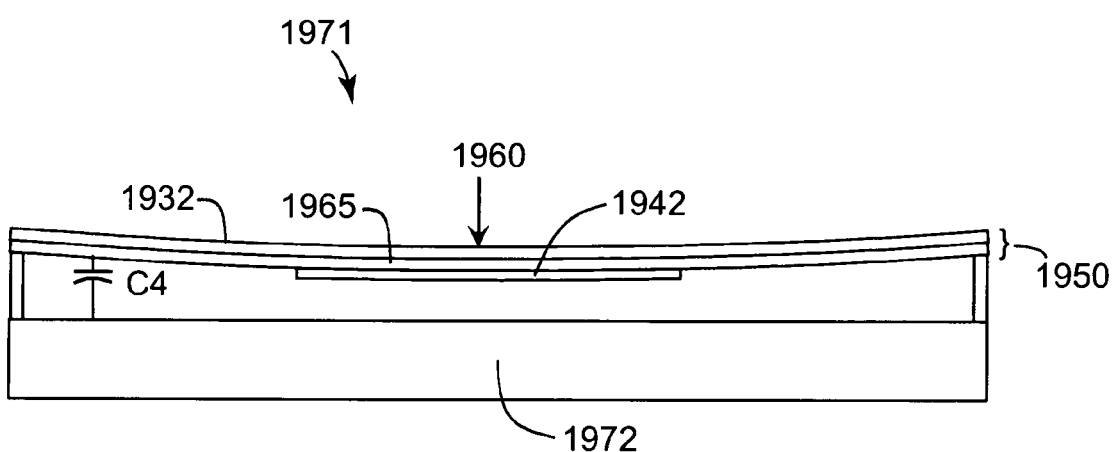

FIGS. 19E and 19F illustrate cross sections of a touch system 1971 employing a capacitive touch panel 1950 and display 1972 and having one or more bending mode sensors 1942 in accordance with embodiments of the invention. The touch panel 1950 includes capacitive substrate 1965 and conductive layer 1932. In the illustrated implementation, the bending mode sensors 1942 are disposed on each edge of the touch panel 1950. In various configurations, the sensors 1942 may extend along the full length of each edge of the touch panel 1950, or a portion of the edge. FIGS. 19E and 19F illustrate the touch system before and after a touch 1960, respectively. In FIG. 19E, there is no bending of the touch panel 1950. In FIG. 19F, a touch 1960 is applied to the touch panel 1950. The touch 1960 causes the touch panel 1950 to bend and may also initiate low frequency oscillations of the touch panel 1950. Touch panel bending and/or low frequency oscillations of the touch panel may be detected by bending mode sensors 1942 and may be used to correct for errors due to touch panel displacement. Displacement and/or low frequency oscillations of the touch panel 1950 may additionally or alternatively be used to calculate the Z-axis force exerted on the touch panel 1950 by the touch 1960.

In one implementation, the bending mode sensors 1942 may be used to measure the displacement of the touch panel 1950 from the untouched position as a result of the touch force 1960. The displacement measured by the bending mode sensors 1942 may be used to correct for errors in the capacitive touch location measurement. In this implementation, error correction may be accomplished by measuring the touch signals, measuring the panel movement using the bending mode sensors 1942 and adjusting the touch position calculation of XT, YT to compensate for capacitance changes caused by displacement of panel 1950.

In another implementation, the bending mode sensors 1942 may be used to measure the low frequency oscillations caused by the touch 1960. The fundamental half-wave frequency of oscillation of a typical glass touch panel is in the range of about 50 Hz to about 1000 Hz, depending on touch panel thickness, edge length, and suspension characteristics. Finger touches produce energy in the range of about 5 Hz to about 1000 Hz. Measuring bending mode signals in the frequency range of about 50 Hz to about 1000 Hz reduces the effects of hysteresis and/or non-linearity in the spring constant of the suspension relative to the near-static 0 to 10 Hz measurements.

In this embodiment, error correction may be accomplished by measuring the touch signals based on capacitive measurements and determining the panel displacement based on the low frequency oscillations of the panel as detected by the bending mode sensors 1942. The touch position calculation of XT, YT may be adjusted using panel movement information acquired by the bending mode sensors 1942 to compensate for capacitance changes caused by displacement of panel 1950.

Referring to FIGS. 18 and 19A, brushing a finger lightly over the front of touch screen 1850, touching down at point 1860 and stroking toward the center of touch screen 1850 would result in the measured line 1866. A touch and simultaneous hard push against touch screen 1850 at point 1860 may also result in an initial measured touch point at point 1860. Then, under increasing touch pressure, touch screen 1850 will move closer to the display on which it is mounted, and substrate 1965 will also bow inward toward its center. This will increase capacitances C4 and C1, which may erroneously result in an apparent shift in touch position along the same line 1866. Thus, a stroking touch and a touch in one location may both be measured as a line. This error due to applied force may be reduced by one of several methods. First, initial touch location may be measured prior to application of significant force, and subsequent changes in measured touch location are ignored when touch force exceeds a preset threshold. Second, the touch position coordinates XT, YT calculated from measurements at corners 1834, 1835, 1836, 1837 (using Equations 4 and 6) may be modified by a second set of displacement coordinates XD, YD calculated from the change in force location as described herein.

Various systems and methods used for error correction in touch location determination are described in commonly owned U.S. patent application Ser. No. 11/093,895, incorporated herein by reference.

Figure 20:
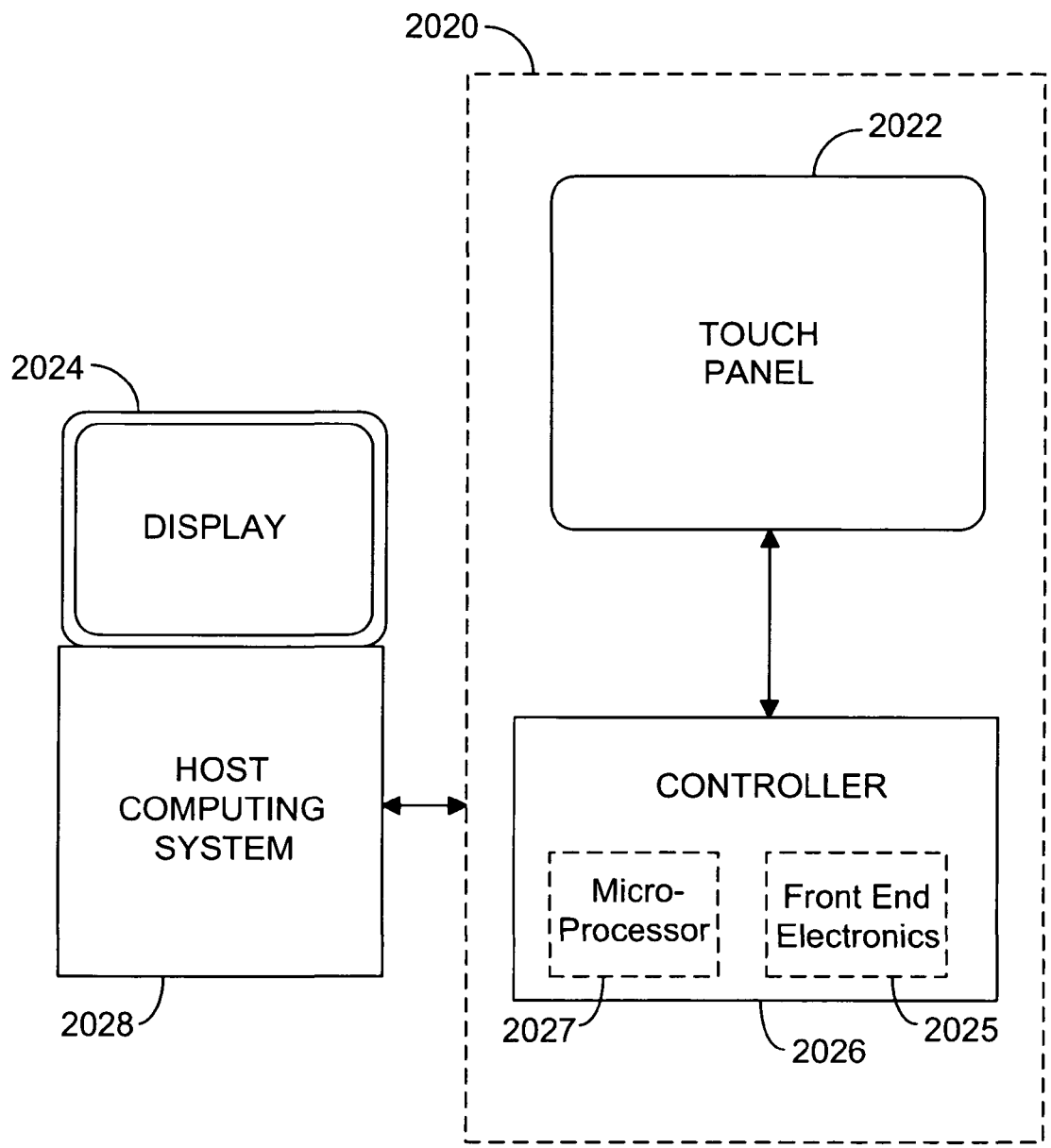
FIG. 20 is a block diagram of a touch screen system suitable for implementing enhanced touch location determination in accordance with embodiments of the invention.

Turning now to FIG. 20, there is shown an embodiment of a touch screen system that is suitable for implementing enhanced touch location determination in accordance with an embodiment of the present invention. The touch system 2020 shown in FIG. 20 includes a touch panel 2022, which is communicatively coupled to a controller 2026. The controller 2026 includes at least electronic circuitry 2025 (e.g., front end electronics) that applies signals to the touch panel 2022 and measures touch signals or touch signal changes and error signals or error signal changes. In more robust configurations, the controller 2026 can further include a microprocessor 2027 in addition to front end electronics 2025. In a typical deployment configuration, the touch panel 2022 is used in combination with a display 2024 of a host computing system 2028 to provide for visual and tactile interaction between a user and the host computing system 2028.

It is understood that the touch panel 2022 can be implemented as a device separate from, but operative with, a display 2024 of the host computing system 2028. Alternatively, the touch panel 2022 can be implemented as part of a unitary system that includes a display device, such as a plasma, LCD, or other type of display technology amenable to incorporation of the touch panel 2022. It is further understood that utility is found in a system defined to include only the touch panel 2022 and controller 2026 which, together, can implement touch detection methodologies of the present invention.

In the illustrative configuration shown in FIG. 20, communication between the touch panel 2022 and the host computing system 2028 is effected via the controller 2026. It is noted that one or more controllers 2026 can be communicatively coupled to one or more touch panels 2022 and the host computing system 2028. The controller 2026 is typically configured to execute firmware/software that provides for detection of touches applied to the touch panel 2022, including error correction for movement of the touch panel in accordance with the principles of the present invention. It is understood that the functions and routines executed by the controller 2026 can alternatively be effected by a processor or controller of the host computing system 2028.

A combination of touch location processes, as illustrated by embodiments of the invention described herein, may be advantageously used to yield superior performance with respect to one or more of the above parameters. Information from two or more touch location processes, for example, may be combined to enhance one or more of the above-mentioned process parameters or other process parameters. Combining the results of multiple independent processes for determining touch location provides a number of advantages over the use of a single process. A combination approach to touch location determination described herein may provide any or all of the following advantages: increased touch location accuracy, decreased complexity of touch location computations, increased speed in touch location determination, decreased power consumption, increased touch location sensitivity, increased immunity to noise and/or enhanced z-axis information, for example.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A touch sensitive device, comprising:
a plurality of touch detectors, comprising:
one or more first touch detectors configured to determine a touch location of a touch on a touch panel using one or more first touch location techniques; and
one or more second touch detectors configured to acquire touch location information using one or more second touch location techniques; and
processing circuitry coupled to the one or more first touch detectors and the one or more second touch detectors, the processing circuitry configured to provide an enhanced accuracy touch location determination based on a combination of the touch location determined by the one or more first touch detectors and the touch location information acquired using the one or more second touch detectors.

2. The device of claim 1, wherein the one or more first touch detectors are configured to determine the touch location with a first degree of precision and the one or more second touch detectors are configured to determine the touch location with a second degree of precision.

3. The device of claim 1, wherein the one or more first touch detectors are configured to determine the touch location with a first degree of accuracy and the one or more second touch detectors are configured to determine the touch location with a second degree of accuracy.

4. The device of claim 1, wherein the processing circuitry is configured to adjust data acquired by the one or more first touch detectors using the touch location information acquired by the one or more second touch detectors.

5. The device of claim 1, wherein the one or more first touch detectors comprise a touch sensor having one or more first characteristics and the one or more second touch detectors comprise one or more touch sensors having one or more second characteristics different from the one or more first characteristics.

6. The device of claim 1, wherein the one or more first touch detectors use a first touch detection algorithm having one or more first characteristics and the one or more second touch detectors use one or more second touch detection algorithms having one or more second characteristics different from the one or more first characteristics.

7. The device of claim 1, wherein the one or more first touch detectors each comprise a first touch sensor having one or more characteristics and the one or more second touch detectors each comprise a second touch sensor having the one or more characteristics and the one or more first touch detectors use a touch detection algorithm having one or more first characteristics and the one or more second touch detectors use one or more second touch detection algorithms having one or more second characteristics different from the one or more first characteristics.

8. The device of claim 1, wherein the processing circuitry uses the touch location information acquired by the one or more second touch detectors to correct for one or more errors in the touch location determined by the one or more first touch detectors in order to provide the enhanced accuracy touch location determination.

* * * * *

UNITED STATES PATENT AND TRADEMARK OFFICE
CERTIFICATE OF CORRECTION

| | | Page 1 of 1 |
|---|---|---|
| PATENT NO. | : 9,019,209 B2 | |
| APPLICATION NO. | : 11/148109 | |
| DATED | : April 28, 2015 | |
| INVENTOR(S) | : Bernard Geaghan | |

It is certified that error appears in the above-identified patent and that said Letters Patent is hereby corrected as shown below:

IN THE SPECIFICATION

<u>Column 6</u>
Line 49, delete "350." and insert -- 350 which includes a microprocessor 340. --

<u>Column 8</u>
Line 65, delete "location." and insert -- location 387. --

Signed and Sealed this
First Day of December, 2015

Michelle K. Lee
*Director of the United States Patent and Trademark Office*